(12) United States Patent
Sawada

(10) Patent No.: US 10,780,777 B2
(45) Date of Patent: Sep. 22, 2020

(54) VEHICLE

(71) Applicant: TOYOTA JIDOSHA KABUSHIKI KAISHA, Toyota-shi, Aichi-ken (JP)

(72) Inventor: Yutaka Sawada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 15/952,697

(22) Filed: Apr. 13, 2018

(65) Prior Publication Data

US 2018/0326842 A1 Nov. 15, 2018

(30) Foreign Application Priority Data

May 11, 2017 (JP) .................................. 2017-094448

(51) Int. Cl.

| B60K 15/07 | (2006.01) |
|---|---|
| B60K 15/067 | (2006.01) |
| B62D 27/06 | (2006.01) |
| B60L 50/71 | (2019.01) |
| B62D 21/15 | (2006.01) |
| B60K 15/03 | (2006.01) |
| B60K 15/063 | (2006.01) |
| B60K 1/00 | (2006.01) |

(52) U.S. Cl.
CPC ............ *B60K 15/07* (2013.01); *B60K 15/067* (2013.01); *B60L 50/71* (2019.02); *B62D 21/152* (2013.01); *B62D 27/065* (2013.01); *B60K 1/00* (2013.01); *B60K 2015/03315* (2013.01); *B60K 2015/0634* (2013.01); *B60K 2015/0637* (2013.01); *B60K 2015/0675* (2013.01); *B60Y 2306/01* (2013.01)

(58) Field of Classification Search
CPC ................ B60K 15/07; B60K 15/067; B60K 2015/0675; B60K 2015/03315
See application file for complete search history.

(56) References Cited

U.S. PATENT DOCUMENTS 7,819,431 B2 * 10/2010 Minami ............... B60K 15/067
 280/781
8,579,331 B2 * 11/2013 Hayashi ................ B60K 15/07
 248/230.1
8,607,909 B2 * 12/2013 Ohashi ..................... B60K 1/04
 180/68.5

(Continued)

FOREIGN PATENT DOCUMENTS

| DE | 102016115702 A1 | 4/2017 |
|---|---|---|
| EP | 2 439 128 A1 | 4/2012 |

(Continued)

*Primary Examiner* — Barry Gooden, Jr.
(74) *Attorney, Agent, or Firm* — Oliff PLC

(57) ABSTRACT

A vehicle comprises a tank that is placed behind a front component in a front-rear direction of the vehicle and that is arranged such that a longitudinal direction of the tank is along the front-rear direction; and a fixation member configured to fix the tank to a vehicle body of the vehicle. The front component and the tank are arranged to at least partly overlap with each other when the vehicle is viewed from a forward direction side. The fixation member releases fixation of the tank to the vehicle body when the front component comes into contact with the tank to apply an external force along the longitudinal direction that is equal to or greater than a predetermined value, to the tank.

7 Claims, 17 Drawing Sheets

(56) References Cited

U.S. PATENT DOCUMENTS

| | | | | |
|---|---|---|---|---|
| 8,672,359 B2* | 3/2014 | Ohashi | .................... | B60K 1/04 |
| | | | | 180/69.4 |
| 8,944,469 B2* | 2/2015 | Mulanon | ............... | F17C 13/084 |
| | | | | 280/834 |
| 9,193,261 B2* | 11/2015 | Sloan | .................. | B60K 15/067 |
| 9,650,002 B2* | 5/2017 | Sasaki | .................. | B60K 15/067 |
| 9,895,999 B2* | 2/2018 | Ohashi | .................... | B60L 50/71 |
| 10,076,956 B2* | 9/2018 | Ohashi | ................... | B60K 28/14 |
| 10,293,684 B2* | 5/2019 | Sasaki | ................... | B60K 15/07 |
| 2002/0121772 A1* | 9/2002 | Koster | .................... | B60K 1/04 |
| | | | | 280/830 |
| 2007/0119646 A1* | 5/2007 | Minami | ............... | B60K 15/067 |
| | | | | 180/271 |
| 2008/0023957 A1* | 1/2008 | Diehl | .................... | B60K 15/07 |
| | | | | 280/834 |
| 2009/0133948 A1 | 5/2009 | Ijaz et al. | | |
| 2010/0252353 A1 | 10/2010 | Tsubokawa | | |
| 2012/0080250 A1* | 4/2012 | Ohashi | .................... | B60K 1/04 |
| | | | | 180/65.31 |
| 2015/0144642 A1* | 5/2015 | Bruns | .................... | B62D 27/04 |
| | | | | 220/562 |
| 2016/0096495 A1* | 4/2016 | Sasaki | .................. | B60K 15/067 |
| | | | | 248/505 |
| 2016/0097487 A1* | 4/2016 | Sasaki | ....................... | F17C 1/02 |
| | | | | 248/505 |
| 2017/0066479 A1* | 3/2017 | Murata | .................... | B60K 1/04 |
| 2017/0101031 A1 | 4/2017 | Ohashi | | |
| 2017/0240045 A1* | 8/2017 | Ohashi | .................. | B60K 15/07 |
| 2017/0282709 A1* | 10/2017 | Sasaki | ............. | B60K 15/03006 |
| 2018/0251023 A1* | 9/2018 | Nishiumi | ............... | B60K 15/07 |
| 2019/0047409 A1* | 2/2019 | Kataoka | ............... | F17C 13/084 |

FOREIGN PATENT DOCUMENTS

| | | |
|---|---|---|
| JP | 2005-112112 A | 4/2005 |
| JP | 2016-088228 A | 5/2016 |
| JP | 2016-168897 A | 9/2016 |
| JP | 2017-74819 A | 4/2017 |
| KR | 10-2007-0069181 A | 7/2007 |
| KR | 10-2017-0043455 A | 4/2017 |

* cited by examiner

VEHICLE

CROSS-REFERENCE TO RELATED APPLICATIONS

The present application claims priority from Japanese patent application 2017-094448 filed on May 11, 2017, the entirety of the content of which is hereby incorporated by reference into this application.

BACKGROUND

Field

The present disclosure relates to a vehicle with a tank mounted thereon.

Related Art

A known technique employed for a fixation structure of a tank fixes one end of the tank by a bracket, so as to fix the tank to a support member (as described in, for example, JP 2016-088228A).

In a configuration of a tank mounted such that a longitudinal direction of the tank is along a front-rear direction of a vehicle, in the case of a collision of the vehicle against another object, a front component that is located ahead of the tank is likely to be moved rearward and collide with the tank. The tank is fixed to a vehicle body by means of a bracket. When the front component collides with the tank, this configuration may fail to release an external force that is applied to the tank by the front component. In this case, the tank is likely to be damaged by the external force. This problem is not characteristic of the bracket but is commonly found in various fixation members that are used to fix the tank to the vehicle body. There is accordingly a need for a technique that reduces the possibility that the tank fixed to the vehicle body by a fixation member is damaged.

SUMMARY

According to one aspect of the present disclosure, there is provided a vehicle with a tank mounted thereon. This vehicle comprises a front component placed in a front room; the tank placed behind the front component in a front-rear direction of the vehicle and arranged such that a longitudinal direction of the tank is along the front-rear direction; and a fixation member configured to fix the tank to a vehicle body of the vehicle on at least one end of the tank in the front-rear direction. The front component and the tank are arranged to at least partly overlap with each other when the vehicle is viewed from a forward direction side. The fixation member releases fixation of the tank to the vehicle body when the front component comes into contact with the tank to apply an external force along the longitudinal direction that is equal to or greater than a predetermined value, to the tank.

DETAILED DESCRIPTION

A. Embodiment

Figure 1:
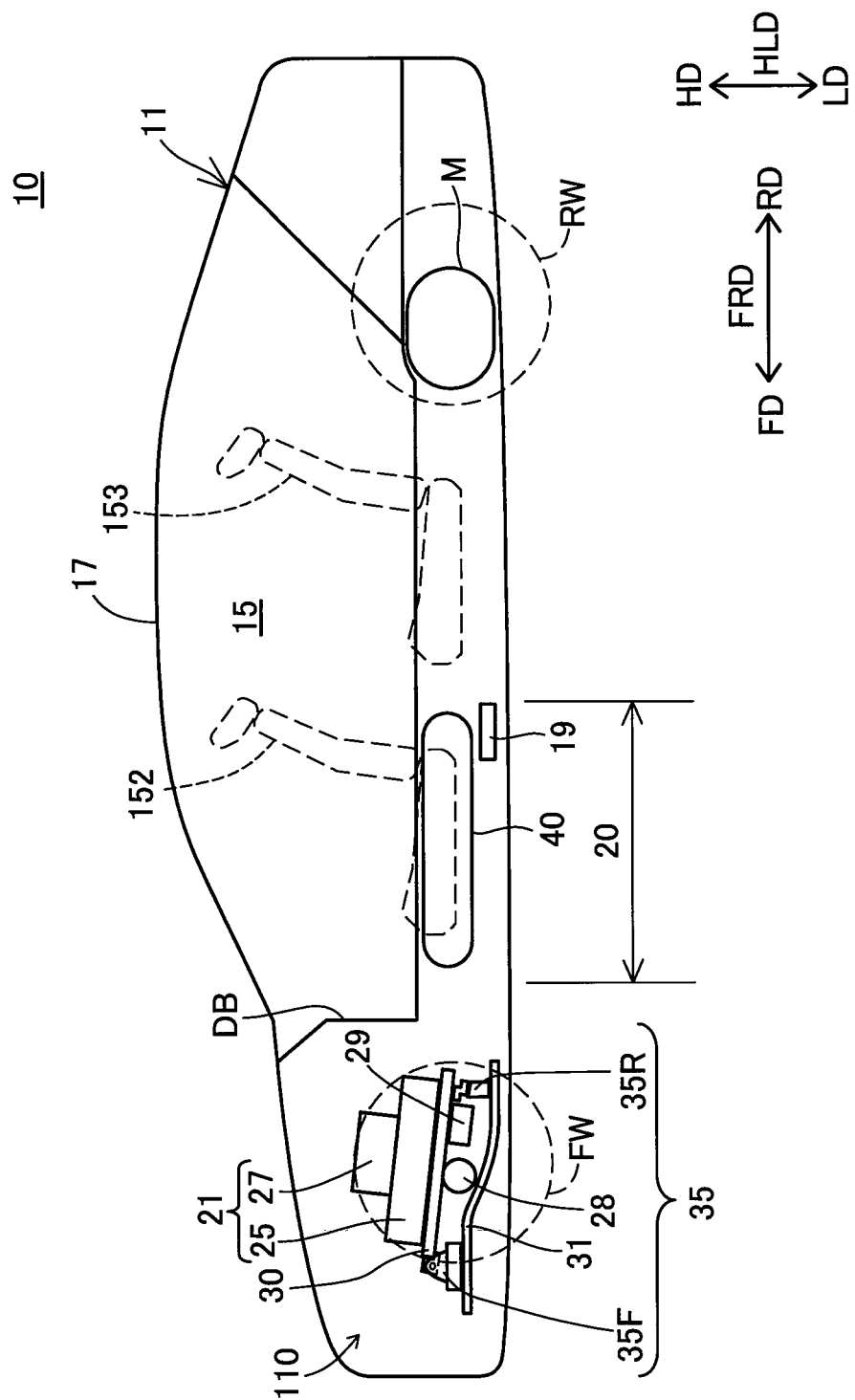
FIG. 1 is a sectional view illustrating the schematic configuration of a vehicle according to one embodiment of the present disclosure.
Figure 2:
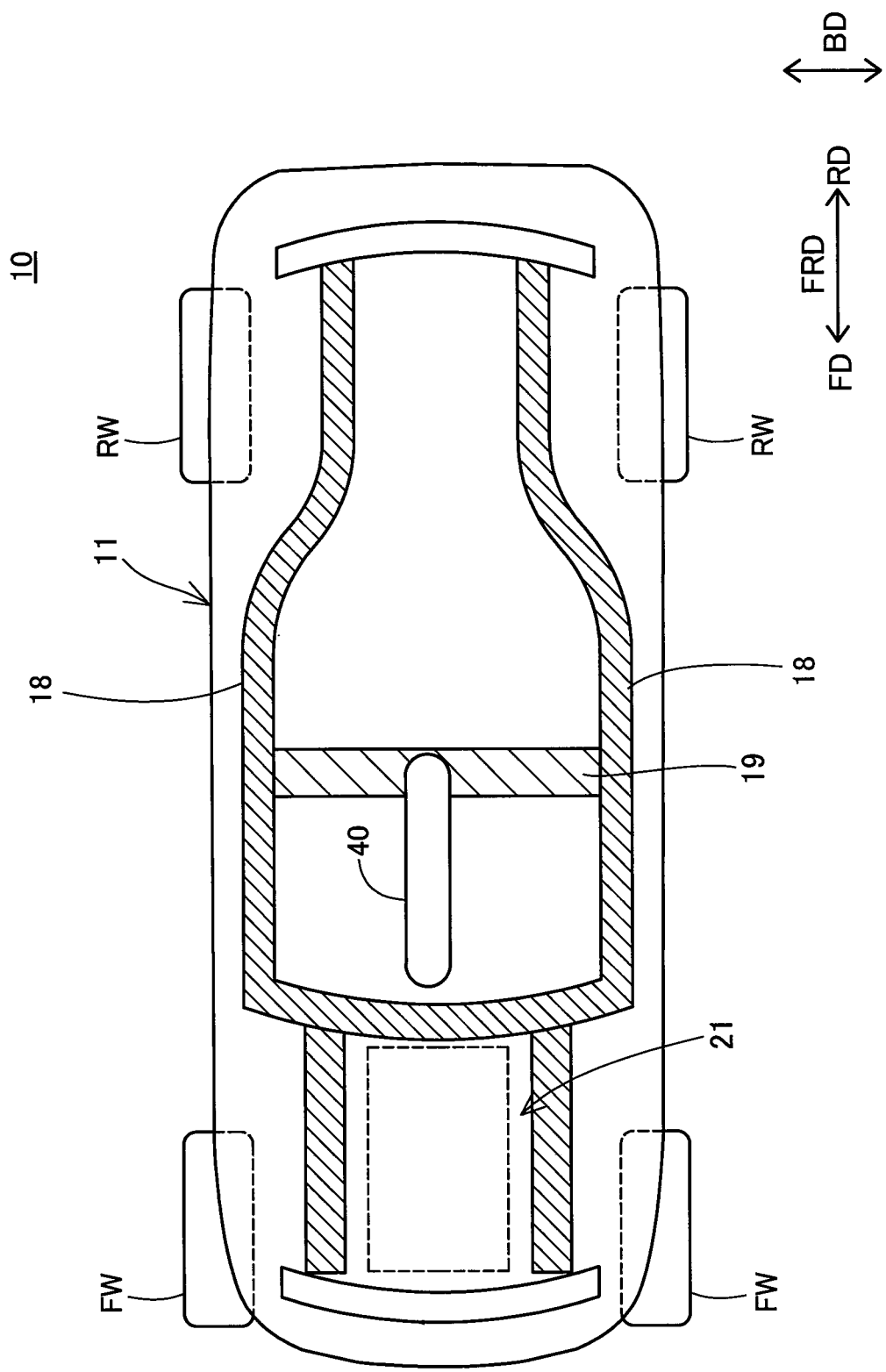
FIG. 2 is a schematic diagram illustrating the configuration of the vehicle.
Figure 3:
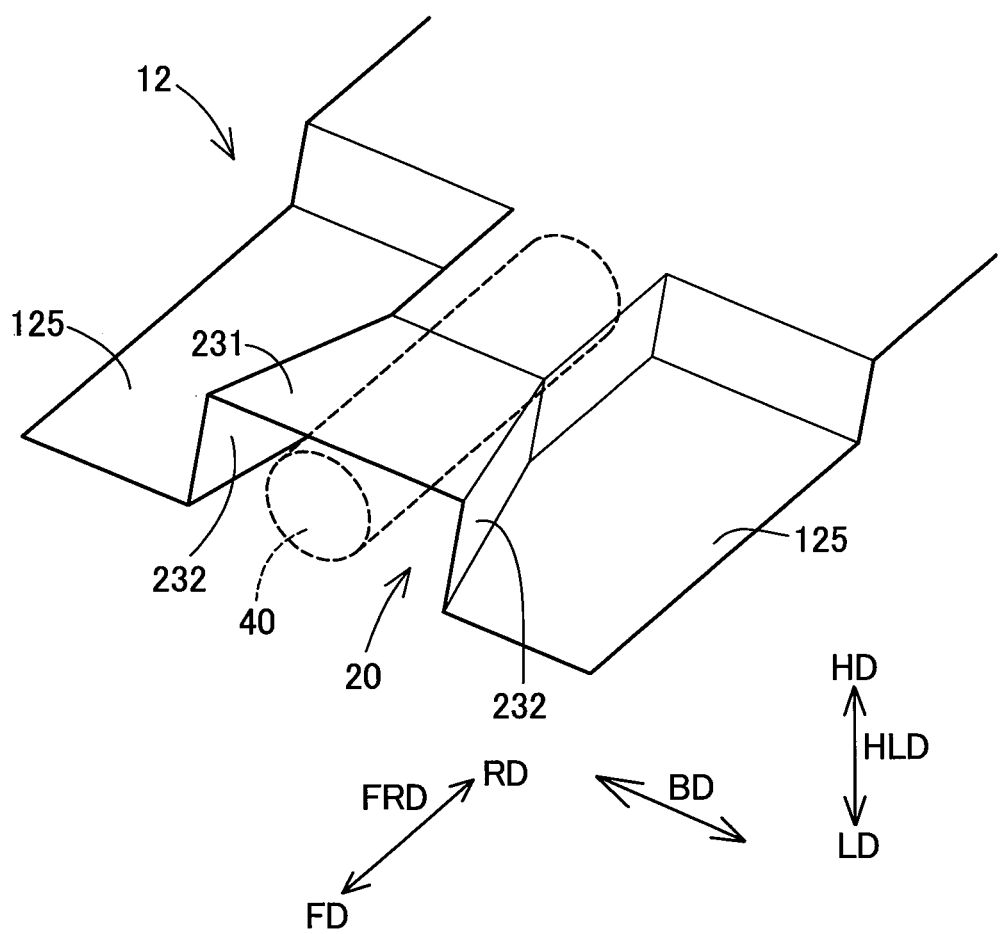
FIG. 3 is a schematic diagram illustrating a floor panel.

FIG. 1 is a sectional view illustrating the schematic configuration of a vehicle 10 according to one embodiment of the present disclosure. FIG. 2 is a schematic diagram illustrating the configuration of the vehicle 10. FIG. 3 is a schematic diagram illustrating a floor panel 12. An arrow FRD indicating a front-rear direction of the vehicle 10 and an arrow HLD indicating a height direction of the vehicle 10 are shown in FIG. 1. The arrow FRD and an arrow BD indicating a width direction of the vehicle 10 are shown in FIG. 2. The arrow FRD, the arrow HLD and the arrow BD are shown in FIG. 3. The arrow FRD, the arrow HLD and the arrow BD may be shown as needed in subsequent drawings. With regard to the front-rear direction FRD, an arrow FD indicates a forward direction of the vehicle 10 and an arrow RD indicates a rearward direction of the vehicle 10. With regard to the height direction HLD, an arrow HD indicates an upward direction of the vehicle 10 and an arrow LD indicates a downward direction of the vehicle 10.

FIG. 1 illustrates a section of the vehicle 10 along the forward direction FD and the rearward direction RD of the vehicle 10 at a center position in the width direction BD of the vehicle 10. FIG. 2 illustrates a top view of the vehicle 10, along with part of an internal configuration.

The vehicle 10 (shown in FIG. 1) includes a vehicle interior 15 and a front room 110. The front room 110 is located on a forward direction FD-side of the vehicle interior 15. The front room 110 is parted from the vehicle interior 15 by a dashboard DB. The vehicle 10 further includes a pair of front wheels FW, a pair of rear wheels RW, a motor M, a vehicle body 11, a frame 18 (shown in FIG. 2), a fuel cell module 21 including a fuel cell stack 25, and a tank 40. The vehicle 10 is a fuel cell vehicle with the fuel cell stack 25 mounted thereon as a power source. The vehicle 10 drives the motor M with electric power generated by the fuel cell stack 25 to drive the rear wheels RW. The tank 40 is releasably fixed to the vehicle body 11 by a bracket described later.

The vehicle body 11 forms a main body of the vehicle 10. The vehicle body 11 includes a room panel 17 (shown in FIG. 1) that forms a top face of the vehicle interior 15 and a floor panel 12 (shown in FIG. 3) that forms a floor face of the vehicle interior 15. Two front seats 152 (only one illustrated in FIG. 1) and three rear seats 153 (only one illustrated in FIG. 1) are placed in the vehicle interior 15.

The frame 18 (shown in FIG. 2) is arranged to support the vehicle body 11. The frame 18 is formed from a metal plate. The frame 18 is, for example, a side member. The floor panel 12 (shown in FIG. 3) is mounted to the frame 18. A stable steering brace 19 (shown in FIG. 2) that is extended along the width direction BD is connected with the frame 18. The stable steering brace 19 is a member that enhances the rigidity of the vehicle body 11 and improves the steering stability. As shown in FIG. 1, the stable steering brace 19 is located below the tank 40 to support the tank 40 released from the vehicle body 11. More specifically, the stable steering brace 19 serves to support the tank 40 that is released from fixation to the vehicle body 11 by the bracket (described later) and falls down. According to the embodiment, the stable steering brace 19 is placed below a first mouthpiece portion of the tank 40 described later.

The fuel cell module 21 (shown in FIG. 1) as one of front components includes the fuel cell stack 25 and an electronic device 27. The fuel cell module 21 is placed in the front room 110. When the vehicle 10 is viewed from the forward direction FD-side, the fuel cell module 21 and the tank 40 at least partly overlap with each other. More specifically, at least part of the fuel cell module 21 (the fuel cell stack 25 according to the embodiment) is placed on the forward direction FD-side of the tank 40. The fuel cell stack 25 is configured by stacking a plurality of fuel cells. The fuel cell of this embodiment is a polymer electrolyte fuel cell. The fuel cell is, however, not limited to the polymer electrolyte fuel cell, but any of various other types of fuel cells may be employed.

The fuel cell stack 25 is supported from below by a stack frame 30. The stack frame 30 is a metal member in a rectangular form in the plan view. A front end portion and a rear end portion of the stack frame 30 are fixed to the suspension member 31 via a mount member 35. The mount member 35 includes a front mount portion 35F provided to fix the front end portion of the stack frame 30 and a rear mount portion 35R provided to fix the rear end portion of the stack frame 30. The suspension member 31 is a member that forms part of the vehicle body 11 of the vehicle 10. For example, auxiliary machines 28 and 29 of the fuel cell stack 25 may be placed in a space between the suspension member 31 and the stack frame 30. The auxiliary machines 28 and 29 may be mounted to, for example, a lower surface side of the stack frame 30 via a bracket. The auxiliary machines 28 and 29 may be, for example, an air compressor 28 provided to feed a cathode gas to the fuel cell stack 25 and an anode off-gas circulation pump 29 provided to recirculate an anode off-gas discharged from the fuel cell stack 25, to the fuel cell stack 25.

The electronic device 27 is placed on the top of the fuel cell stack 25. This layout suppresses expansion of the dimensions of the fuel cell module 21 in the front-rear direction FRD and in the width direction BD. This layout, on the other hand, increases the dimension of the fuel cell module 21 in the height direction HLD. The electronic device 27 includes an inverter and may serve to, for example, convert a dc power generated in the vehicle 10 to an ac power. The converted ac power is output to the motor M.

The tank 40 is connected with the fuel cell stack 25 by a piping (not shown). The tank 40 stores a high-pressure anode gas (hydrogen gas according to the embodiment) that is to be supplied to the fuel cell stack 25. The tank 40 is placed below the floor panel 12 as shown in FIG. 3.

The floor panel 12 (shown in FIG. 3) includes two main body portions 125 that are located on respective sides in the width direction BD to have the front seats 152 placed thereon, and a center tunnel 20 that is located between the two main body portions 125 in the width direction BD. The main body portions 125 are approximately horizontal members.

The center tunnel 20 is protruded upward (toward the vehicle interior 15) from the main body portions 125. The center tunnel 20 is formed in a portion located at the center of the vehicle 10 in the width direction BD. The center tunnel 20 is extended in the front-rear direction FRD of the vehicle 10. The center tunnel 20 includes two side portions 232 that rise from the respective main body portions 125, and a top portion 231 that connects upper ends of the two side portions with each other to form a top face of the center tunnel 20. The tank 40 is placed inside of the center tunnel 20.

Figure 4:
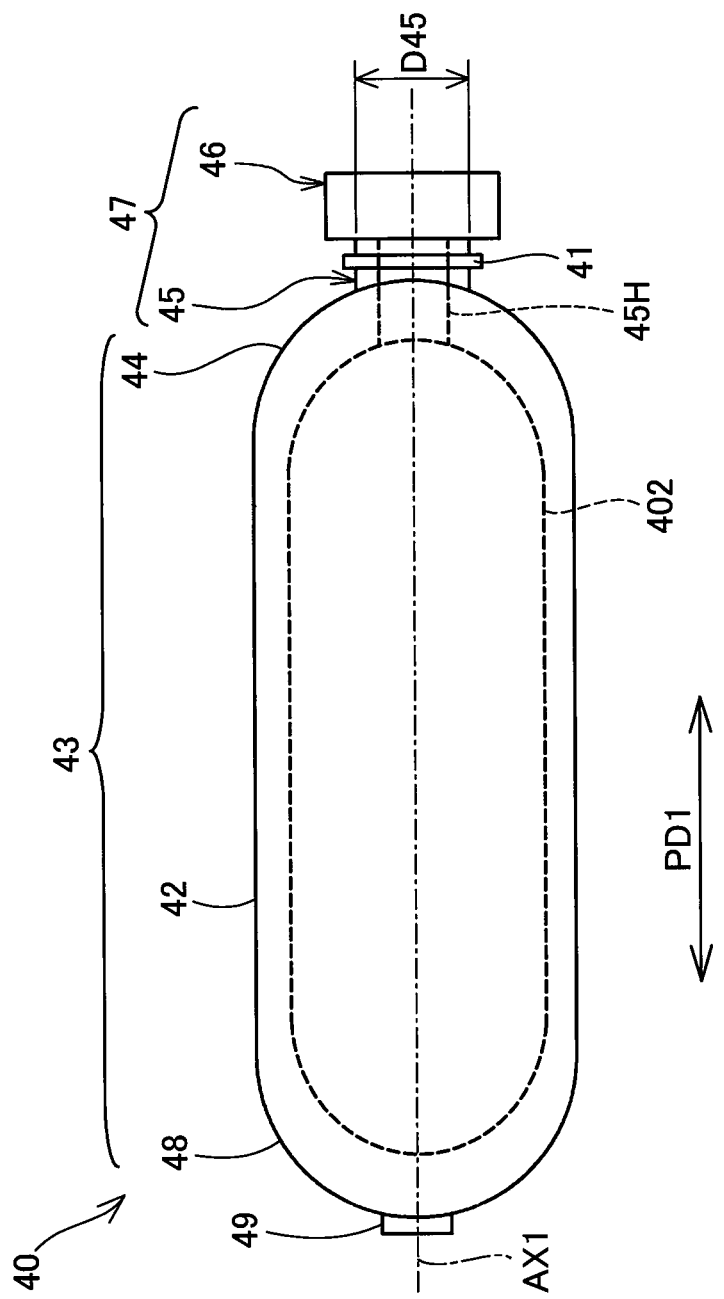
FIG. 4 is an appearance view illustrating a tank.

FIG. 4 is an appearance view illustrating the tank 40. An axis line AX1 of the tank 40 is shown in FIG. 4. The tank 40 includes a tank main body 43, a first mouthpiece portion 47 and a second mouthpiece portion 49. A longitudinal direction PD1 of the tank 40 is a left-right direction of the sheet surface. According to the embodiment, the tank 40 has a mass in a range of 40 kg to 50 kg.

The tank main body 43 stores hydrogen inside thereof, as the fuel of the vehicle 10 (more specifically, the fuel cell stack 25). The tank main body 43 includes a body portion 42, a first dome portion 44 and a second dome portion 48.

The body portion 42 is a cylindrical member extended in the longitudinal direction PD1. According to the embodiment, the body portion 42 has a diameter in a range of 300 mm to 320 mm. The first dome portion 44 is a semispherical member that is connected with one end of the body portion 42 in the longitudinal direction PD1. The first dome portion 44 is tapered with an increase in distance from the body portion 42. The second dome portion 48 is a semispherical member that is connected with the other end of the body portion 42 in the longitudinal direction PD1. The second dome portion 48 is tapered with an increase in distance from the body portion 42.

The first mouthpiece portion 47 is located on a top of the first dome portion 44. In other words, the first mouthpiece portion 47 is provided at one end of the tank 40 in the longitudinal direction PD1. The first mouthpiece portion 47 is fixed to the vehicle body 11 by a fixation member described later. The first mouthpiece portion 47 includes a mouthpiece main body 45 and a valve 46. The mouthpiece main body 45 is inserted in an opening formed at one end of the tank main body 43, so as to form a communication hole 45H that connects inside 402 of the tank main body 43 with outside. According to the embodiment, the mouthpiece main body 45 has a diameter D45 in a range of 50 mm to 60 mm. The valve 46 is inserted in the mouthpiece main body 45 and is mounted to the mouthpiece main body 45. The valve 46 serves to open and close the communication hole 45H. An outer circumferential face of a portion of the mouthpiece main body 45 that is protruded out from the tank main body 43 is provided with a convex 41 that is extended along a circumferential direction and serves as an engaged element. The convex 41 is protruded from the outer circumferential face of the mouthpiece main body 45.

The second mouthpiece portion 49 is located on a top of the second dome portion 48. In other words, the second mouthpiece portion 49 is provided at the other end of the tank 40 in the longitudinal direction PD1. The second mouthpiece portion 49 is inserted in an opening formed at the other end of the tank main body 43. The second mouthpiece portion 49 does not have a communication hole formed to connect inside of the tank main body 43 with outside.

Figure 5:
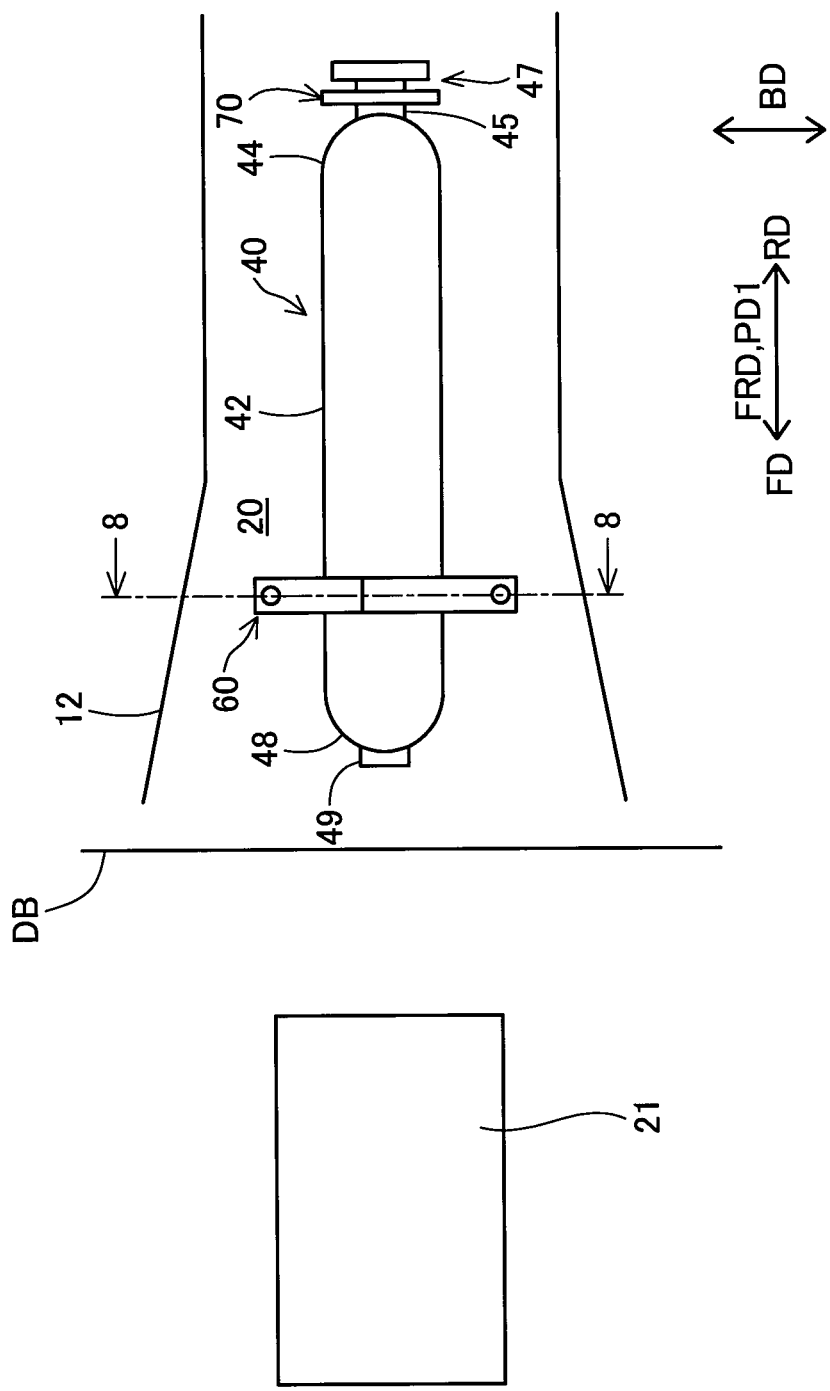
FIG. 5 is a first diagram illustrating the locations of the tank and a fuel cell module.
Figure 6:
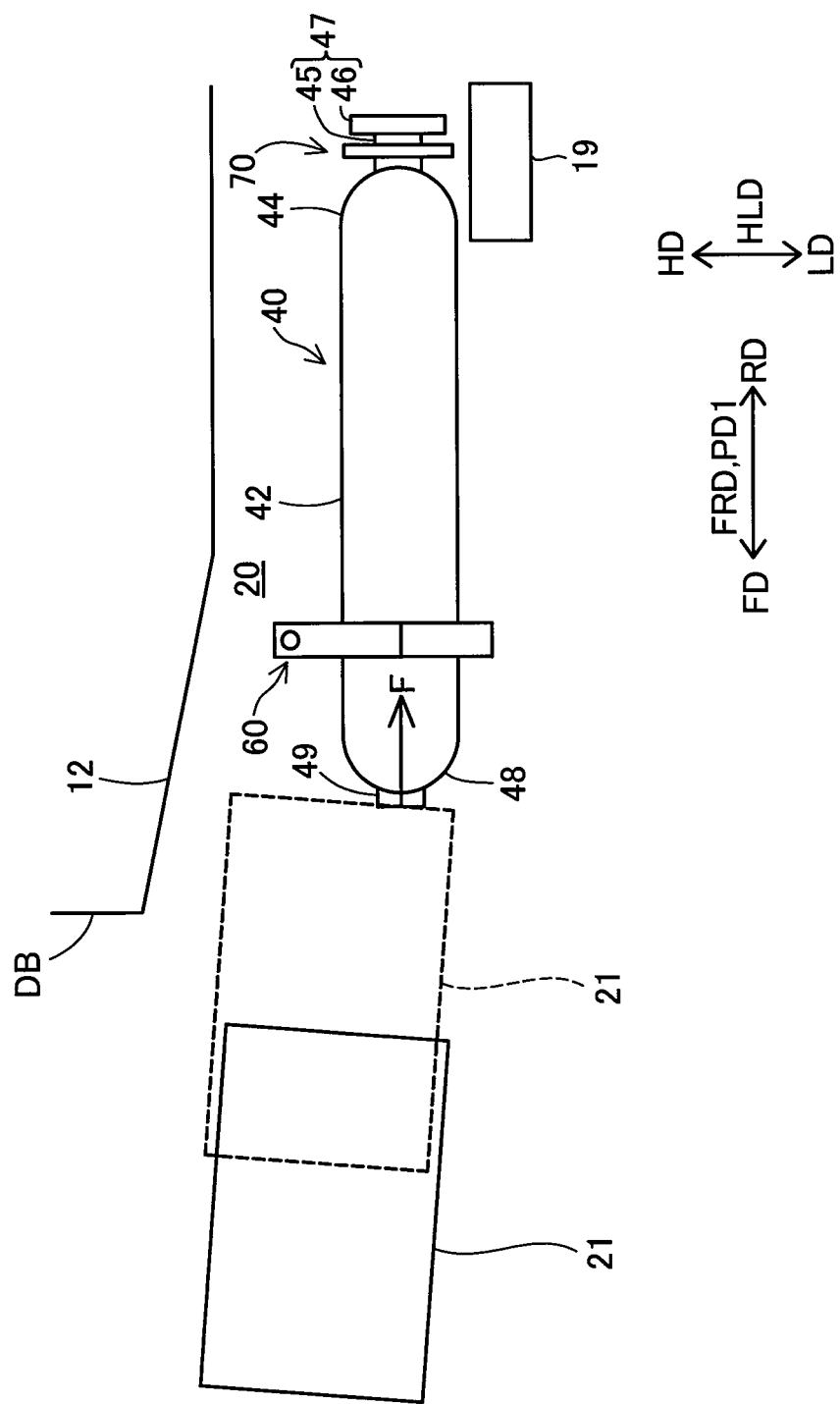
FIG. 6 is a second diagram illustrating the locations of the tank and the fuel cell module.

FIG. 5 is a first diagram illustrating the locations of the tank 40 and the fuel cell module 21. FIG. 6 is a second diagram illustrating the locations of the tank 40 and the fuel cell module 21. FIG. 5 is a schematic diagram when the vehicle 10 is viewed from below. FIG. 6 is a schematic sectional view when a region where the tank 40 and the fuel cell module 21 is viewed in the width direction BD of the vehicle 10. The location of the stable steering brace 19 is schematically shown in FIG. 6.

As shown in FIGS. 5 and 6, the tank 40 is placed inside of the center tunnel 20, such that the longitudinal direction PD1 of the tank 40 is along the front-rear direction FRD of the vehicle 10. According to the embodiment, the longitudinal direction PD1 is parallel to the front-rear direction FRD. The arrangement that the longitudinal direction PD1 is along the front-rear direction FRD includes an arrangement that the longitudinal direction PD1 is a direction within ±20 degrees relative to the front-rear direction FRD, in addition to the arrangement that the longitudinal direction PD1 is parallel to the front-rear direction FRD. The tank 40 is located behind the fuel cell module 21 as a front component in the front-rear direction FRD of the vehicle 10.

The tank 40 is fixed to the floor panel 12 of the vehicle body 11 by means of a fixation member 70 and a band 60. The fixation member 70 is provided to fix the tank 40 to the vehicle body 11 on at least one end of the tank 40 in the front-rear direction FRD. According to the embodiment, the fixation member 70 is provided to fix the first mouthpiece portion 47 provided at one end on the rear side of the tank 40 to the floor panel 12 of the vehicle body 11.

As shown in FIG. 6, when the vehicle 10 is subjected to an impact, for example, a front collision, the fuel cell module 21 is likely to move in the rearward direction RD and collide with (make contact with) the tank 40. When the fuel cell module 21 collides with (makes contact with) the tank 40, an external force F along the longitudinal direction PD1 is applied to the tank 40. The direction of the external force F is the rearward direction RD. When the external force F is equal to or higher than a predetermined value, the fixation member 70 releases the fixation of the tank 40 to the floor panel 12. The external force F that is equal to or higher than the predetermined value is also called external force FP. An upper limit value of the predetermined value is preferably set to be a smaller value than an external force (load) that damages the tank 40 by cracking or the like. This configuration reduces the possibility of damage of the tank 40. A lower limit value of the predetermined value is set to be preferably 0.5 times or more preferably 0.7 times the external force (load) that damages the tank 40 by cracking or the like. This configuration suppresses the fixation of the tank 40 to the floor panel 12 from being unintentionally released during ordinary operation of the vehicle 10. The predetermined value may be set to, for example, 80 KN. The release of the fixation of the tank 40 to the panel 12 will be described in detail later.

The band 60 is provided to surround and hold the body portion 42 and fix the tank 40 to the floor panel 12. The band 60 surrounds a part of the body portion 42 located on the other end side in the longitudinal direction PD1 of the tank 40. As shown in FIG. 6, the stable steering brace 19 is placed below the first mouthpiece portion 47.

Figure 7:
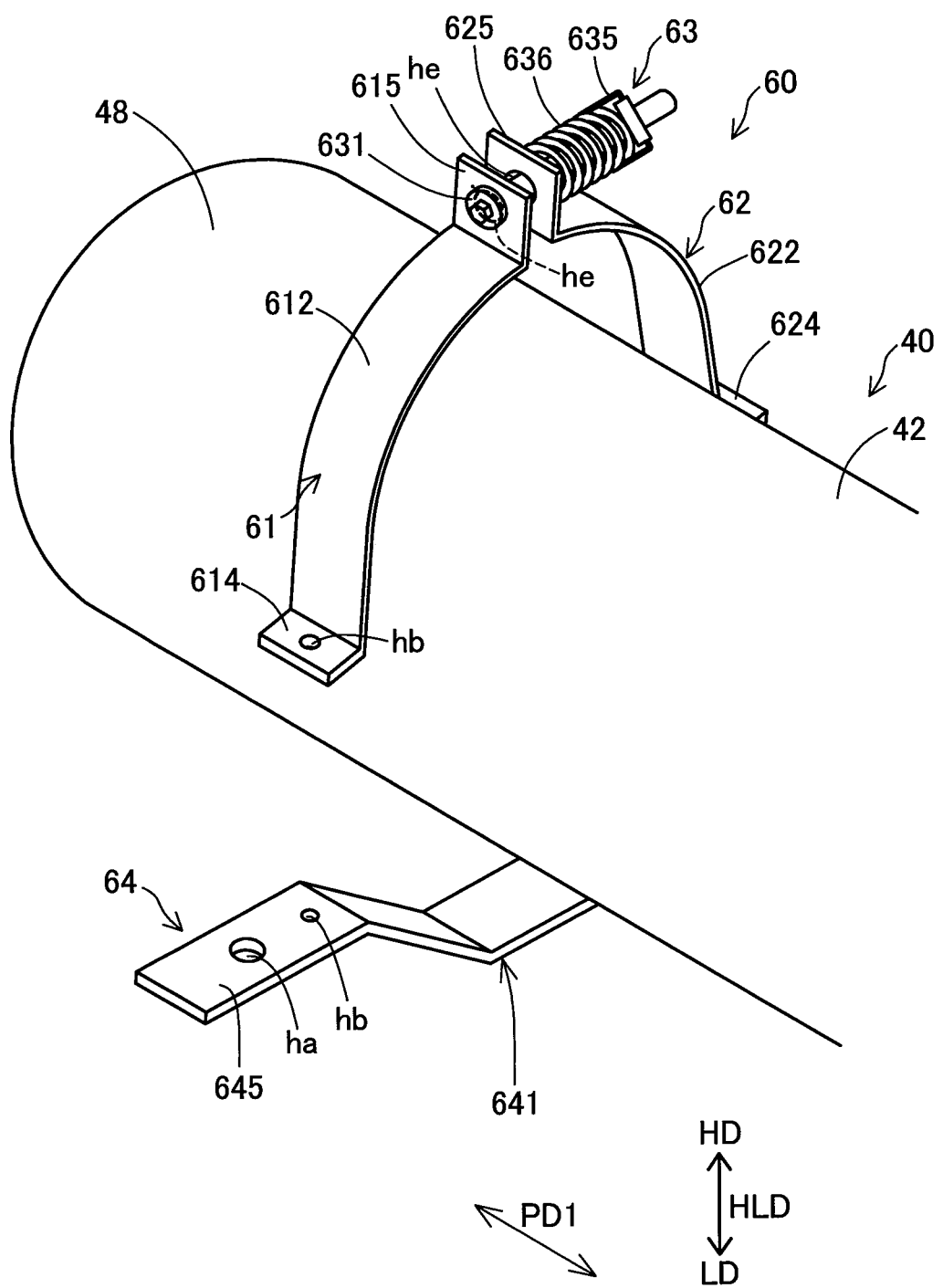
FIG. 7 is a diagram illustrating a band
Figure 8:
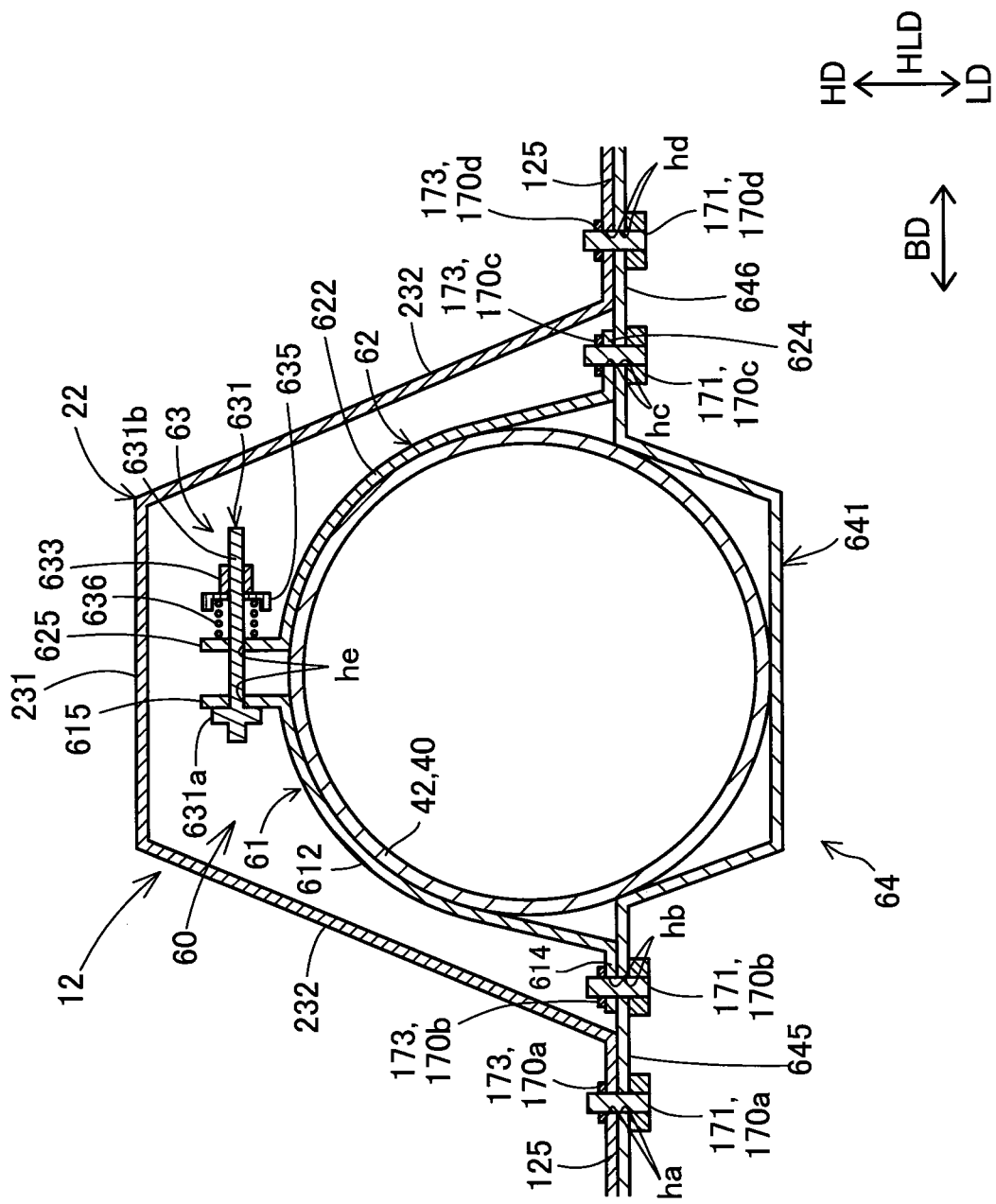
FIG. 8 is a sectional view taken on a line 8-8 shown in FIG. 5.

FIG. 7 is a diagram illustrating the band 60. FIG. 8 is a sectional view taken on a line 8-8 shown in FIG. 5. The detailed configuration of the band 60 is described below with reference to FIGS. 7 and 8.

The band 60 is provided to surround and hold an outer circumferential face of the body portion 42 and fix the body portion 42 to the floor panel 12. The band 60 (shown in FIG. 7) includes a first upper band main body 61, a second upper band main body 62, a lower band main body 64, a band main body clamping member 63 and first to fourth clamping members 170a to 170d (shown in FIG. 8). As shown in FIG. 8, the first upper band main body 61, the second upper band main body 62 and the lower band main body 64 are arranged to surround the outer circumferential face of the body portion 42 and hold the body portion 42. The first upper band main body 61 and the second upper band main body 62 are respectively located above the lower band main body 64.

The first upper band main body 61, the second upper band main body 62 and the lower band main body 64 are respectively made of a metal such as steel. In another example, the first upper band main body 61, the second upper band main body 62 and the lower band main body 64 may be respectively made of a synthetic resin. As shown in FIG. 8, each of the first to the fourth clamping members 170a to 170d is comprised of a bolt 171 and a nut 173.

The first upper band main body 61 includes a band main body portion 612 that comes into contact with part of the outer circumferential face of the body portion 42 along a circumferential direction, a first clamping portion 614 that is connected with one end of the band main body portion 612, and a second clamping portion 615 that is connected with the other end of the band main body portion 612. The first clamping portion 614 has a through hole hb that is formed to receive the bolt 171 of the second clamping member 170b inserted therein. The second clamping portion 615 has a through hole he that is formed to receive a bolt 631 of the band main body clamping member 63 inserted therein.

The second upper band main body 62 includes a band main body portion 622 that comes into contact with another part of the outer circumferential face of the body portion 42 along the circumferential direction, a first clamping portion 624 that is connected with one end of the band main body portion 622, and a second clamping portion 625 that is connected with the other end of the band main body portion 622. The first clamping portion 624 has a through hole hc that is formed to receive the bolt 171 of the third clamping member 170c inserted therein. The second clamping portion 625 has a through hole he that is formed to receive the bolt 631 of the band main body clamping member 63 inserted therein. The through hole he of the second clamping portion 615 and the through hole he of the second clamping portion 625 are arranged to be opposed to each other in the width direction BD of the vehicle 10.

The lower band main body 64 includes a frame main body portion 641 which a lower part of the body portion 42 is placed in, a first lower band clamping portion 645 that is connected with one end of the frame main body portion 641, and a second lower band clamping portion 646 that is connected with the other end of the frame main body portion 641.

The first lower band clamping portion 645 has a through hole ha that is formed to receive the bolt 171 of the first clamping member 170*a* inserted therein, and a through hole hb that is formed to receive the bolt 171 of the second clamping member 170 inserted therein. The second lower band clamping portion 646 has a through hole hc that is formed to receive the bolt 171 of the third clamping member 170*c* inserted therein, and a through hole hd that is formed to receive the bolt 171 of the fourth clamping member 170*d* inserted therein.

As shown in FIG. 8, the first clamping portion 614 of the first upper band main body 61 and the first lower band clamping portion 645 of the lower band main body 64 are fixed to each other by the second clamping member 170*b* (the bolt 171 and the nut 173). The first clamping portion 624 of the second upper band main body 62 and the second lower band clamping portion 646 of the lower band main body 64 are fixed to each other by the third clamping member 170*c* (the bolt 171 and the nut 173). The first lower band clamping portion 645 of the lower band main body 64 and the main body portion 125 of the floor panel 12 are fixed to each other by the first clamping member 170*a* (the bolt 171 and the nut 173). The second lower band clamping portion 646 of the lower band main body 64 and the main body portion 125 of the floor panel 12 are fixed to each other by the fourth clamping member 170*d* (the bolt 171 and the nut 173).

The band main body clamping member 63 (shown in FIG. 7) serves to fix the second clamping portion 615 of the first upper band main body 61 and the second clamping portion 625 of the second upper band main body 62 to each other and clamp the first upper band main body 61 and the second upper band main body 62. The band main body clamping member 63 includes a coil spring 636, a coil spring bearing 635, a bolt 631 and a nut 633 (shown in FIG. 8).

The coil spring 636 is arranged in a compressed state and generates a biasing force to clamp the second clamping portion 615 of the first upper band main body 61 and the second clamping portion 625 of the second upper band main body 62. One end of the coil spring 636 comes into contact with the coil spring bearing 635, and the other end of the coil spring 636 comes into contact with the second clamping portion 625 of the second upper band main body 62. A shaft portion 631*b* of the bolt 631 is inserted through the second clamping portion 615 of the first upper band main body 61, the second clamping portion 625 of the second upper band main body 62 and the coil spring bearing 635. A head 631*a* of the bolt 631 comes into contact with the second clamping portion 615 of the first upper band main body 61. The nut 633 is tightened to the shaft portion 631*b* of the bolt 631 in a direction of compressing the coil spring 636 via the coil spring bearing 635. This configuration causes the second clamping portion 615 of the first upper band main body 61 and the second clamping portion 625 of the second upper band main body 62 to come closer to each other and thereby reduces a region to surround the body portion 42 by the first upper band main body 61, the second upper band main body 62 and the lower band main body 64. Reducing the region to surround the body portion 42 causes the body portion 42 to be clamped and held by the first upper band main body 61, the second upper band main body 62 and the lower band main body 64. The band 60 uses its frictional force to restrict the motion of the tank 40 in the longitudinal direction PD1.

Figure 9:
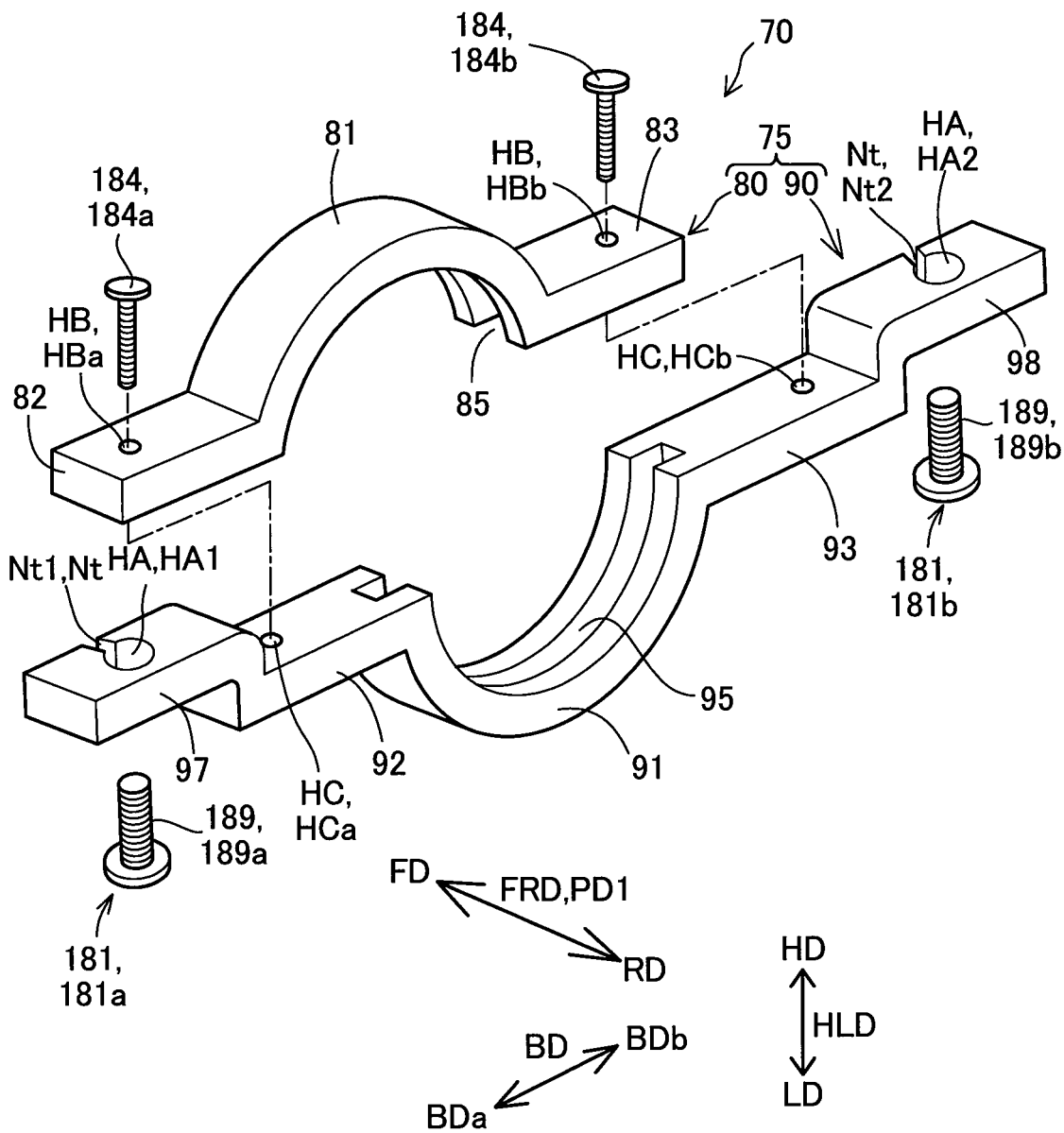
FIG. 9 is a perspective view illustrating a fixation member.
Figure 10:
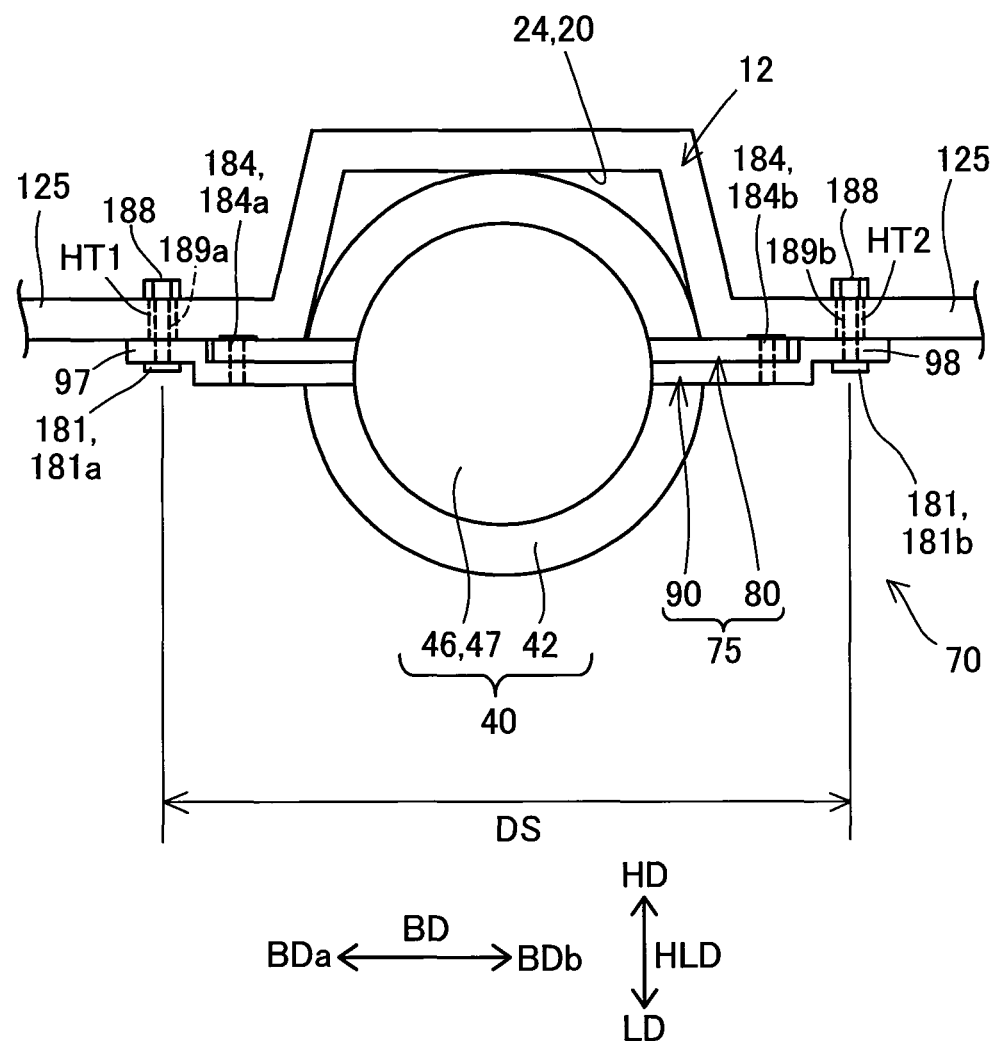
FIG. 10 is a rear view illustrating the state of the tank that is fixed to the floor panel.
Figure 11:
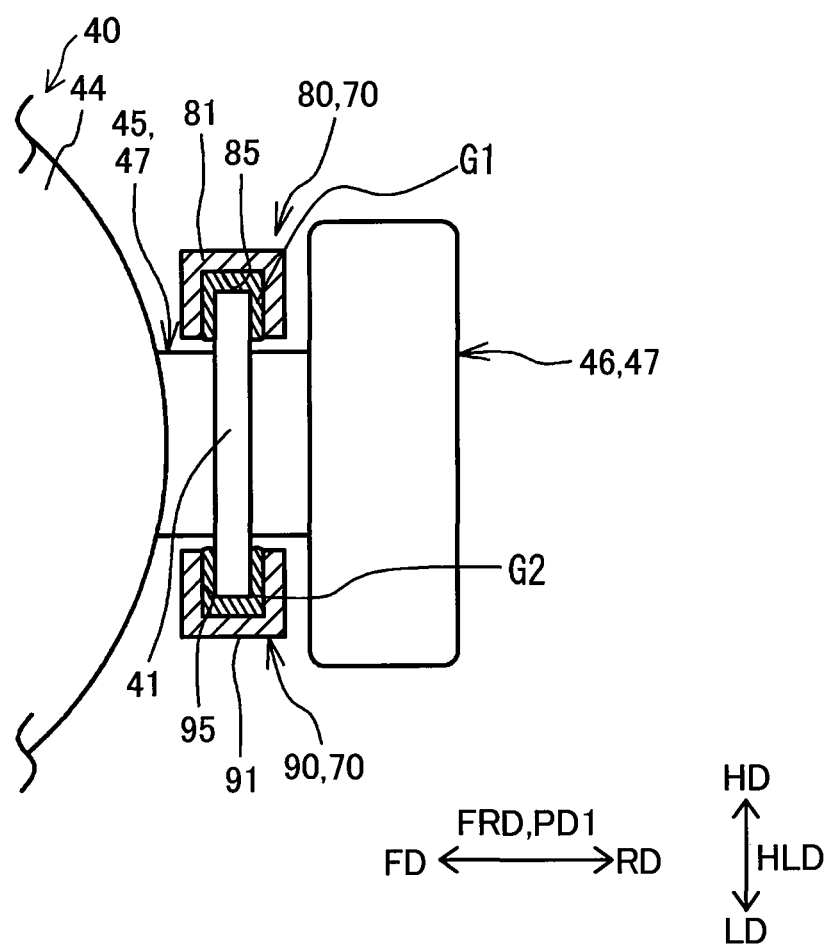
FIG. 11 is a diagram illustrating engagement of a first bracket main body and a second bracket main body with a mouthpiece main body.

FIG. 9 is a perspective view illustrating the fixation member 70. FIG. 10 is a rear view illustrating the state of the tank 40 that is fixed to the floor panel 12. FIG. 11 is a diagram illustrating engagement of a first bracket main body 80 and a second bracket main body 90 with the mouthpiece main body 45. FIG. 11 illustrates sections of the first and second bracket main bodies 80 and 90 and rubber members G1 and G2.

The fixation member 70 (shown in FIG. 10) is arranged to surround the first mouthpiece portion 47 of the tank 40 and fix the first mouthpiece portion 47 side of the tank 40 to the floor panel 12. The fixation member 70 (shown in FIG. 9) includes a bracket 75 configured to engage with the first mouthpiece portion 47 and restrict the motion of the tank 40 in the longitudinal direction PD1, bolts 181 for vehicle body fixation configured to fix the bracket 75 to the floor panel 12, and bolts 184 for bracket fixation. According to the embodiment, two bolts 181 are provided and are expressed as 181*a* and 181*b* when there is a need to distinguish the two bolts 181 from each other. According to the embodiment, two bolts 184 for bracket fixation are provided and are expressed as 184*a* and 184*b* when there is a need to distinguish the two bolts 184 from each other.

The bracket 75 is arranged to surround the first mouthpiece portion 47 in the circumferential direction. The bracket 75 includes a first bracket main body 80 and a second bracket main body 90. The first bracket main body 80 and the second bracket main body 90 are respectively made of a metal such as steel. According to the embodiment, the first bracket main body 80 and the second bracket main body 90 are respectively made of vanadium steel. In another example, the first bracket main body 80 and the second bracket main body 90 may be made of a synthetic resin. The first bracket main body 80 presses down the mouthpiece main body 45 (shown in FIG. 4), and the second bracket main body 90 presses up the mouthpiece main body 45, so that the mouthpiece main body 45 is held. In other words, the first bracket main body 80 and the second bracket main body 90 are arranged to surround the outer circumferential face of the mouthpiece main body 45 and thereby sandwich and hold the mouthpiece main body 45.

The first bracket main body 80 (shown in FIG. 9) is formed in such a shape that is extended along the width direction BD and is curved to be convex in the upward direction HD in the middle. The first bracket main body 80 includes a curved portion 81, a base end portion 82, and a leading end portion 83.

The curved portion 81 is curved along the circumferential direction of the mouthpiece main body 45. More specifically, the curved portion 81 is formed in a semicircular shape that is convex in the upward direction HD when the curved portion 81 is viewed from the forward direction FD-side. The base end portion 82 is extended along the curvature of the curved portion 81 from one end of the curved portion 81 outward in the width direction BD (first outward direction BDa). The leading end portion 83 is extended along the curvature of the curved portion 81 from the other end of the curved portion 81 outward in the width direction BD (second outward direction BDb). The base end portion 82 includes a mounting hole HBa that is pierced in the height direction HLD of the vehicle 10. The leading end portion 83 includes a mounting hole HBb that is pierced in the height direction HLD of the vehicle 10. When there is no need to distinguish the two mounting holes HBa and HBb from each other, a reference sign HB is used to express these mounting holes. The thickness direction of the base end portion 82 and the leading end portion 83 is identical with the height direction HLD of the vehicle 10.

The second bracket main body 90 serving as the bracket main body is formed in such a shape that is extended along the width direction BD and is curved to be convex in the downward direction LD in the middle. The second bracket main body 90 includes a curved portion 91, a base end portion 92, a leading end portion 93, a first fixing portion 97 and a second fixing portion 98.

The curved portion 91 is curved along the circumferential direction of the mouthpiece main body 45. More specifically, the curved portion 91 is formed in a semicircular shape that is convex in the downward direction LD when the curved portion 91 is viewed from the forward direction FD-side. The base end portion 92 is extended along the curvature of the curved portion 91 from one end of the curved portion 91 in the first outward direction BDa. The leading end portion 93 is extended along the curvature of the curved portion 91 from the other end of the curved portion 91 in the second outward direction BDb. The base end portion 92 includes a mounting hole HCa that is pierced in the height direction HLD of the vehicle 10. The leading end portion 93 includes a mounting hole HCb that is pierced in the height direction HLD of the vehicle 10. When there is no need to distinguish the two mounting holes HCa and HCb from each other, a reference sign HC is used to express these mounting holes. The thickness direction of the base end portion 92 and the leading end portion 93 is identical with the height direction HLD of the vehicle 10.

The first fixing portion 97 is extended in the first outward direction BDa from an opposite end of the base end portion 92 that is opposite to the side where the curved portion 91 is located. The second fixing portion 98 is extended in the second outward direction BDb from an opposite end of the leading end portion 93 that is opposite to the side where the curved portion 91 is located. The first fixing portion 97 includes a bolt hole HA1 that is pierced through the second bracket main body 90 (more specifically, the first fixing portion 97) in the height direction HLD of the vehicle 10, and a cut Nt1 that is connected with the bolt hole HA1. The cut Nt1 is formed to pass through the second bracket main body 90 (more specifically, the first fixing portion 97) in the height direction HLD of the vehicle 10. The second fixing portion 98 includes a bolt hole HA2 that is pierced through the second bracket main body 90 (more specifically, the second fixing portion 98) in the height direction HLD of the vehicle 10, and a cut Nt2 that is connected with the bolt hole HA2. The cut Nt2 is formed to pass through the second bracket main body 90 (more specifically, the second fixing portion 98) in the height direction HLD of the vehicle 10. The two cuts Nt1 and Nt2 are arranged to cause shaft portions 189a and 189b of the bolts 181a and 181b to pass through openings 212 and 222 when an external force FP is applied to the tank 40 and thereby to release the fixation of the tank 40 to the vehicle body 11 (to the floor panel 12 according to the embodiment). When there is no need to distinguish the two bolt holes HA1 and HA2 from each other, a reference sign HA is used to express these bolt holes. When there is no need to distinguish the two cuts Nt1 and Nt2 from each other, a reference sign Nt is used to express these cuts. The thickness direction of the first fixing portion 97 and the second fixing portion 98 is identical with the height direction HLD of the vehicle 10.

Recesses 85 and 95 are respectively formed as engagement elements in respective inner circumferential faces of the curved portions 81 and 91. The recess 85 is recessed from the inner circumferential face of the curved portion 81. The recess 95 is recessed from the inner circumferential face of the curve portion 91. The recess 85 is formed along the circumferential direction of the curved portion 81. The recess 95 is formed along the circumferential direction of the curved portion 91. The recesses 85 and 95 (shown in FIG. 11) receive and engage with the convex 41 of the mouthpiece main body 45 fit therein, so as to restrict the motion of the tank 40 in the longitudinal direction PD1. According to the embodiment, a rubber member G1 as a cushioning member is placed between the convex 41 of the mouthpiece main body 45 and the recess 85 of the first bracket main body 80. A rubber member G2 as a cushioning member is placed between the convex 41 of the mouthpiece main body 45 and the recess 95 of the second bracket main body 90. Accordingly, the convex 41 is fit in and engaged with the recess 85 via the rubber member G1 and is fit and engaged with in the recess 95 via the rubber member G2 according to the embodiment. The arrangement that the convex 41 is fit in and engaged with the recesses 85 and 95 restricts the motion of the tank 40 relative to the floor panel 12 in the longitudinal direction PD1. The rubber members G1 and G2 may be omitted.

As shown in FIG. 9 and FIG. 10, the base end portion 82 and the base end portion 92 are laid over and aligned with each other in the height direction HLD, and the bolt 184a is inserted through the mounting holes HBa and HCa. A female screw is formed on the inner peripheral surface of the mounting hole HCa of the second bracket main body 90, and the bolt 184a is screwed with the female screw. A female screw that is screwed with the bolt 184a may also be formed on the inner peripheral surface of the mounting hole HBa of the first bracket main body 80. The leading end portion 83 and the leading end portion 93 are laid over and aligned with each other in the height direction HLD, and the bolt 184b is inserted through the mounting holes HBb and HCb. A female screw is formed on the inner peripheral surface of the mounting hole HCb of the second bracket main body 90, and the bolt 184b is screwed with the female screw. A female screw that is screwed with the bolt 184b may also be formed on the inner peripheral surface of the mounting hole HBb of the first bracket main body 80. The clamping forces of the bolts 184a and 184b fix the first bracket body 80 and the second bracket body 90 to each other. In other words, the bolts 184 serve as member to fix the first bracket main body 80 and the second bracket main body 90 to each other. Alternatively, the bolts 184a, 184b may be tightened by using nuts instead of the female screws.

The shaft portion 189a of the bolt 181a is inserted through the bolt hole HA1 and a bolt hole HT1 (shown in FIG. 10) that is formed in the main body portion 125 of the floor panel 12. A nut 188 is tightened to the bolt 181a in the state that the shaft portion 189a of the bolt 181a is inserted into the bolt holes HA1 and HT1. The shaft portion 189b of the bolt 181b is inserted through the bolt hole HA2 and a bolt hole HT2 (shown in FIG. 10) that is formed in the main body portion 125 of the floor panel 12. A nut 188 is tightened to the bolt 181b in the state that the shaft portion 189b of the bolt 181b is inserted into the bolt holes HA2 and HT2. The clamping forces of the bolts 181a and 181b fix the bracket 75 to the floor panel 12. As shown in FIGS. 9 to 11, the bolts 181a and 181b fix the bracket 75 to the floor panel 12 at a position outside of a region of the first mouthpiece portion 47 surrounded by the bracket 75 in the width direction BD (the region where the bracket 75 is placed in the longitudinal direction PD1). According to the embodiment, an interval DS between the bolts 181a and 181b in the width direction BD is 250 mm to 300 mm.

Figure 12:
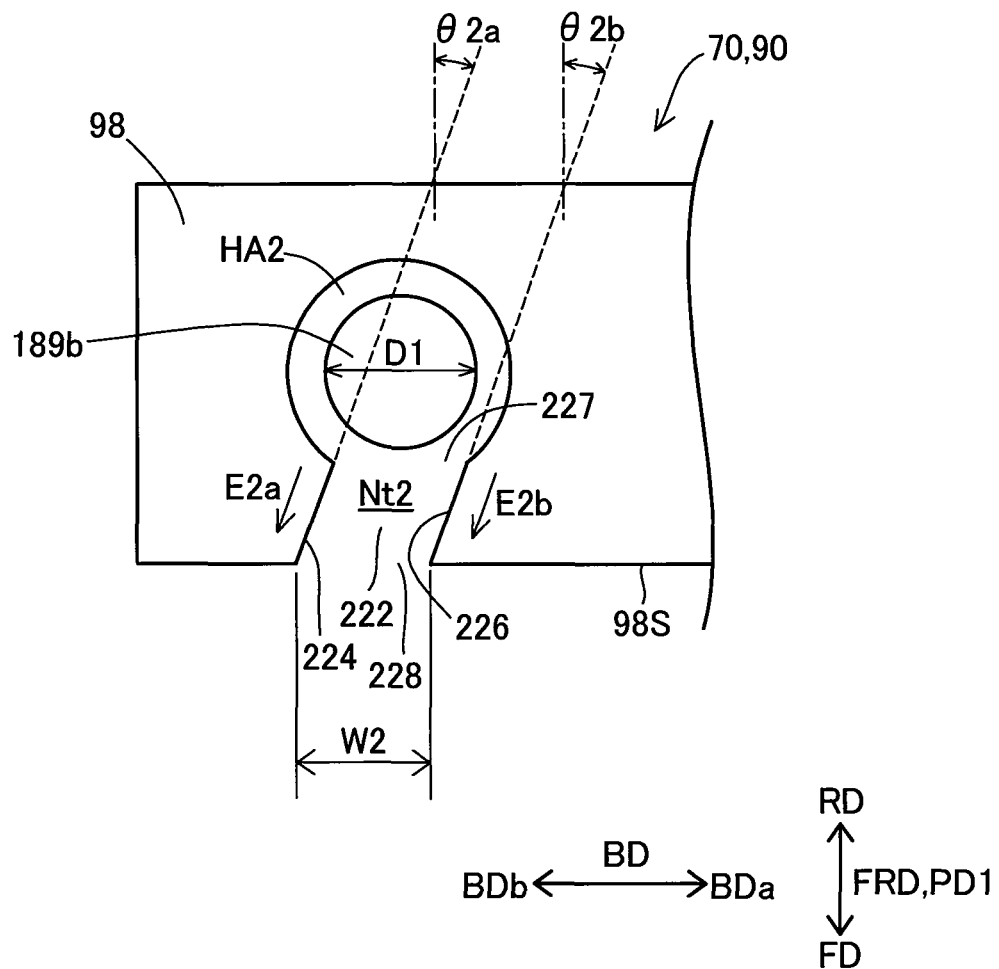
FIG. 12 is a diagram illustrating the detailed configuration of a cut.

FIG. 12 is a diagram illustrating the detailed configuration of the cut Nt2. The cut Nt2 forms an opening 222 that is extended from the bolt hole HA2 toward the forward direction FD-side. The opening 222 has an opening width W2 that is smaller than a diameter D1 of the shaft portion 189b.

The cut Nt2 includes a one-end opening portion 227, an other-end opening portion 228, an outer side face 224 and an inner side face 226. The one-end opening portion 227 forms one end of the opening 222 and is connected with the bolt hole HA2. The other-end opening portion 228 forms the other end of the opening 222 and is opposed to the one-end opening portion 227 in the front-rear direction FRD. The other-end opening portion 228 is formed in a side face 98S on the forward direction FD-side of the second bracket main body 90 (more specifically, the second fixing portion 98).

The outer side face 224 forms a side face of the opening 222 on the outer side in the width direction BD of the vehicle 10. More specifically, the outer side face 224 is a side face on the second outward direction BDb-side. The outer side face 224 is inclined to the front-rear direction FRD such as to be located on the outer side in the width direction BD (more specifically, on the more second outward direction BDb-side) from the one-end opening portion 227 toward the other-end opening portion 228. In other words, a direction E2a in which the outer side face 224 is extended from the one-end opening portion 227 toward the other-end opening portion 228 includes a second outward direction BDb-component and a forward direction FD-component. According to the embodiment, an inclination angle θ2a of the outer side face 224 relative to the front-rear direction FRD is preferably in a range of not less than 7 degrees and not greater than 19 degrees. This reason will be described later.

The inner side face 226 forms a side face of the opening 222 on the inner side in the width direction BD of the vehicle 10. More specifically, the inner side face 226 is a side face on the first outward direction BDa-side. The inner side face 226 is inclined to the front-rear direction FRD such as to be located on the outer side in the width direction BD (more specifically, on the more second outward direction BDb-side) from the one-end opening portion 227 toward the other-end opening portion 228. In other words, a direction E2b in which the inner side face 226 is extended from the one-end opening portion 227 toward the other-end opening portion 228 includes a second outward direction BDb-component and a forward direction FD-component. According to the embodiment, an inclination angle θ2b of the inner side face 226 relative to the front-rear direction FRD is preferably in a range of not less than 7 degrees and not greater than 19 degrees. This reason will be described later.

Figure 13:
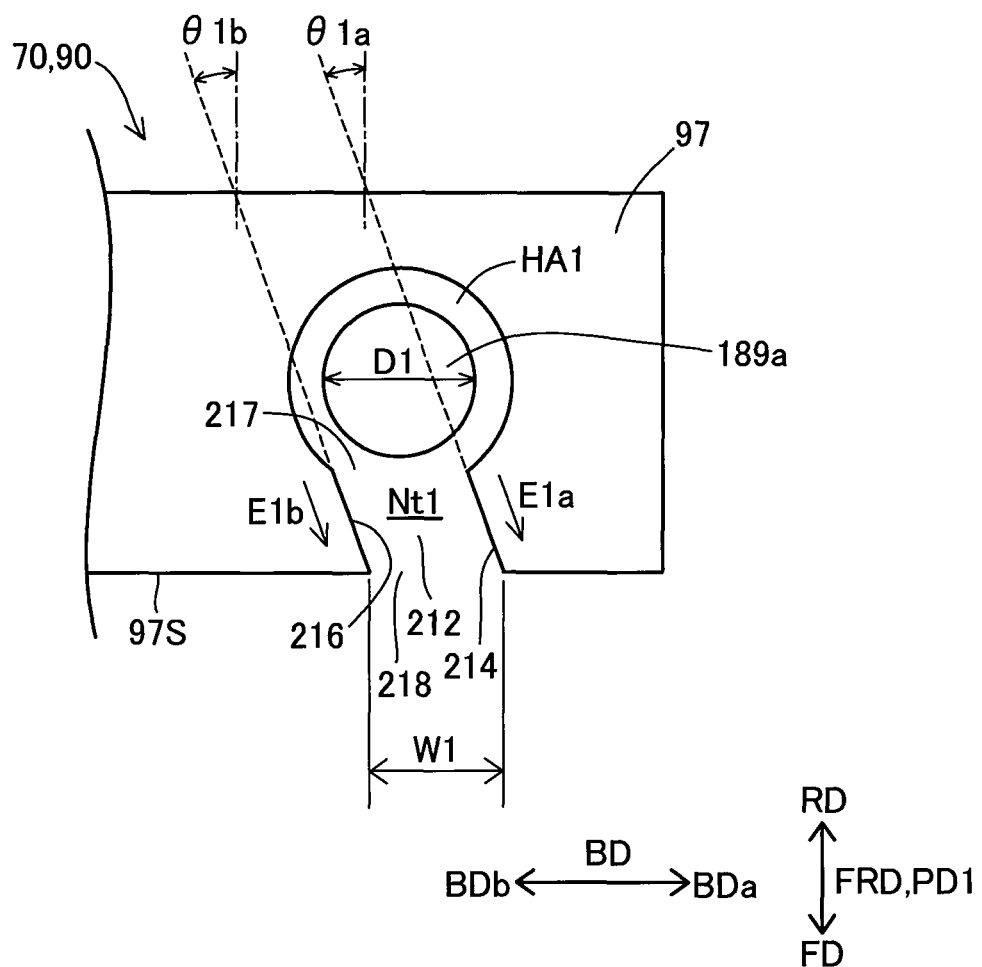
FIG. 13 is a diagram illustrating the detailed configuration of another cut.

FIG. 13 is a diagram illustrating the detailed configuration of the cut Nt1. The cut Nt1 forms an opening 212 that is extended from the bolt hole HA1 toward the forward direction FD-side. The opening 212 has an opening width W1 that is smaller than the diameter D1 of the shaft portion 189a. According to the embodiment, the opening width W1 is equal to the opening width W2.

The cut Nt1 includes a one-end opening portion 217, an other-end opening portion 218, an outer side face 214 and an inner side face 216. The one-end opening portion 217 forms one end of the opening 212 and is connected with the bolt hole HA1. The other-end opening portion 218 forms the other end of the opening 212 and is opposed to the one-end opening portion 217 in the front-rear direction FRD. The other-end opening portion 218 is formed in a side face 97S on the forward direction FD-side of the second bracket main body 90 (more specifically, the first fixing portion 97).

The outer side face 214 forms a side face of the opening 212 on the outer side in the width direction BD of the vehicle 10. More specifically, the outer side face 214 is a side face on the first outward direction BDa-side. The outer side face 214 is inclined to the front-rear direction FRD such as to be located on the outer side in the width direction BD (more specifically, on the more first outward direction BDa-side) from the one-end opening portion 217 toward the other-end opening portion 218. In other words, a direction E1a in which the outer side face 214 is extended from the one-end opening portion 217 toward the other-end opening portion 218 includes a first outward direction BDa-component and a forward direction FD-component. According to the embodiment, an inclination angle θ1a of the outer side face 214 relative to the front-rear direction FRD is preferably in a range of not less than 7 degrees and not greater than 19 degrees. This reason will be described later.

The inner side face 216 forms a side face of the opening 212 on the inner side in the width direction BD of the vehicle 10. More specifically, the inner side face 216 is a side face on the second outward direction BDb-side. The inner side face 216 is inclined to the front-rear direction FRD such as to be located on the outer side in the width direction BD (more specifically, on the more first outward direction BDa-side) from the one-end opening portion 217 toward the other-end opening portion 218. In other words, a direction E1b in which the inner side face 216 is extended from the one-end opening portion 217 toward the other-end opening portion 218 includes a first outward direction BDa-component and a forward direction FD-component. According to the embodiment, an inclination angle θ1b of the inner side face 216 relative to the front-rear direction FRD is preferably in a range of not less than 7 degrees and not greater than 19 degrees. This reason will be described later.

Figure 14:
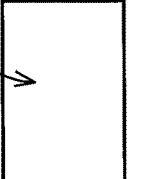
FIG. 14 is a diagram illustrating a fixation member according to a reference example.

FIG. 14 is a diagram illustrating a fixation member 70t according to a reference example. The fixation member 70t differs from the fixation member 70 of the embodiment by an arrangement that an outer side face 224t and an inner side face 226t of a cut Nt2t provided in a second fixing portion 98t and an outer side face and an inner side face of a cut provided in a first fixing portion (not shown) are not inclined relative to the front-rear direction FRD but are parallel to the front-rear direction FRD. Otherwise the configuration of the reference example is similar to the configuration of the embodiment. Like components are accordingly expressed by like reference signs, and their description is omitted.

The following describes behaviors of the bolt 181 on the second fixing portion 98t-side that passes through the cut Nt2t and is removed from the bolt hole HA2. This description is similarly applicable to a first fixing portion side. FIG. 14 illustrate two different behaviors at a minimum frictional force and at a maximum frictional force by taking into account a variation in frictional force that is likely to occur with a variation in manufacture when the bolt 181 passes through the cut Nt2t.

In a non-load state (assembled state a) with no external force FP applied to the tank 40 and the fixation member 70t, the shaft portion 189 of the bolt 181 is placed inside of the bolt hole HA2. In this state, the tank 40 is fixed to the floor panel 12 by means of the fixation member 70t. When the fuel cell module 21 as a front component is moved in the rearward direction RD by, for example, a front collision of the vehicle 10 to collide with (make contact with) the tank 40 and an external force FP in the rearward direction RD is applied to the tank 40, a bracket 75t moves along with the tank 40 in the rearward direction RD. This causes the bolt 181 fixed to the floor panel 12 to be moved in the forward direction FD relative to the bracket 75t, so that the shaft portion 189 of the bolt 181 comes into contact with the cut Nt2t (state b). In the state b, at the maximum frictional force, the second fixing portion 98t with the cut Nt2t formed therein is deformed to be located on the forward direction FD-side by an external force from the shaft portion 189.

When the bolt 181 is further moved in the forward direction FD relative to the bracket 75*t*, the external force from the shaft portion 189 deforms the second fixing portion 98*t* with the cut Nt2*t* formed therein to be located on the forward direction FD-side and causes an opening 222*t* of the cut Nt2*t* to be pressed open by the shaft portion 189 (state c immediately before removal). When the bolt 181 is furthermore moved in the forward direction FD relative to the bracket 75*t*, the shaft portion 189 passes through the opening 222*t* of the cut Nt2*t*, so that the bolt 181 is removed from the cut Nt2*t*. This releases the fixation of the tank 40 to the vehicle body 11 by means of the fixation member 70*t*. In the state c immediately before removal, the second fixing portion 98*t* is inclined such that a second outward direction BDb-side end of the second fixing portion 98*t* is displaced on the forward direction FD-side in a range of 7 degrees to 19 degrees relative to the width direction BD. Accordingly, in the state c immediately before removal, the outer side face 224*t* and the inner side face 226*t* of the cut Nt2*t* are inclined to the front-rear direction FRD in the range of 7 degrees to 11 degrees. When the bolt 181 is moved relative to the bracket 75*t* in the forward direction FD to cause the shaft portion 189 to pass through the opening 222*t* of the cut Nt2*t*, the shaft portion 189 is likely to be stuck, for example, at a corner (edge) of a one-end opening portion 227 of the cut Nt2*t* and fail to smoothly pass through the opening 222*t*. When the shaft portion 189 fails to smoothly pass through the opening 222*t*, application of the external force FP to the tank 40 does not release the fixation of the tank 40 to the vehicle body 11. The tank 40 is thus likely to be damaged by the external force FP.

Figure 15:
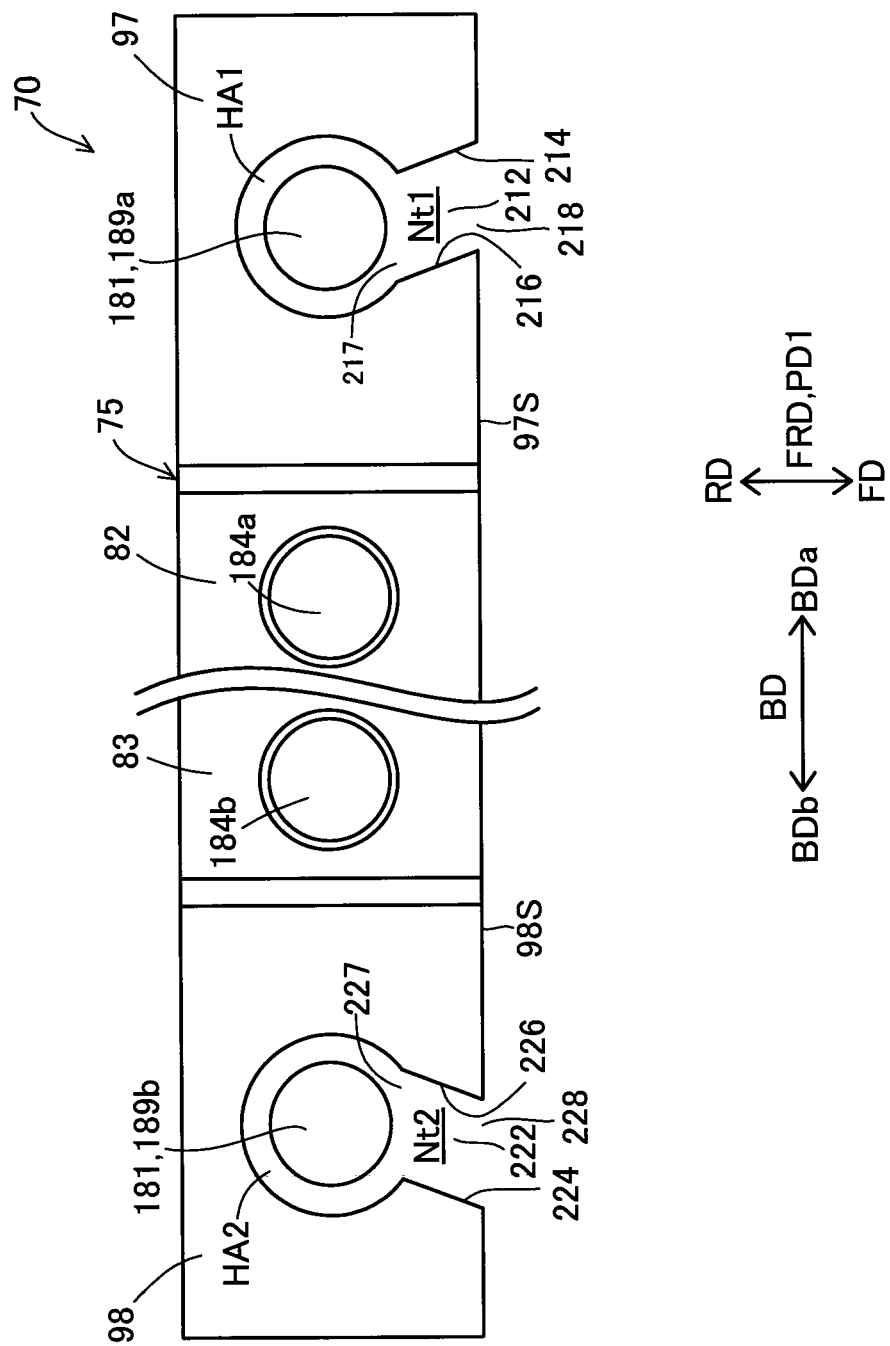
FIG. 15 is a first diagram illustrating release of fixation of the tank to a vehicle body by means of the fixation member.
Figure 16:
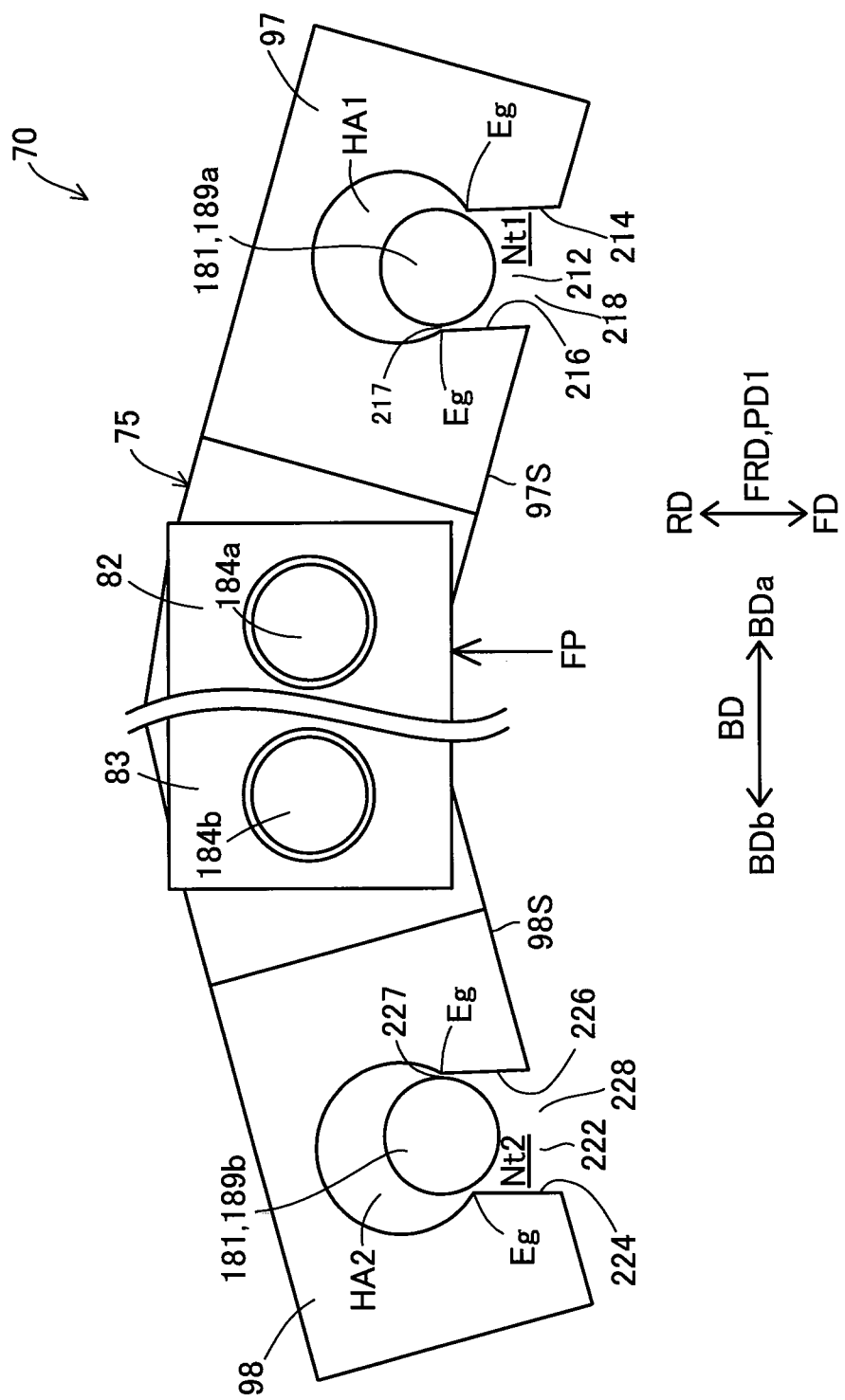
FIG. 16 is a second diagram illustrating release of fixation of the tank to the vehicle body by means of the fixation member.

FIG. 15 is a first diagram illustrating release of the fixation of the tank 40 to the vehicle body 11 by means of the fixation member 70. FIG. 16 is a second diagram illustrating release of the fixation of the tank 40 to the vehicle body 11 by means of the fixation member 70. The diagram of FIG. 15 illustrates the non-load state where no external force FP is applied to the tank 40 or the fixation member 70. The diagram of FIG. 16 illustrates the state (state immediately before removal) immediately before the shaft portions 189*a* and 189*b* press open the openings 212 and 222 to pass through the openings 212 and 222 by application of an external force FP to the tank 40 and the fixation member 70.

In the state shown in FIG. 15, when the fuel cell module 21 is moved in the rearward direction RD by an impact such as a front collision of the vehicle 10 and applies an external force FP in the rearward direction RD to the tank 40, the bracket 75 moves along with the tank 40 in the rearward direction RD (as shown in FIG. 16). This causes the bolt 181 to be moved relative to the bracket 75 in the forward direction FD. External forces from the shaft portions 189*a* and 189*b* cause the first fixing portion 97 and the second fixing portion 98 to be deformed such as to be located on the forward direction FD-side, and the openings 212 and 222 are pressed open by the shaft portions 189*a* and 189*b*. In the non-load state, the outer side faces 214 and 224 and the inner side faces 216 and 226 of the cuts Nt1 and Nt2 are inclined to the front-rear direction FRD such as to be located on the outer side in the width direction BD from the one-end opening portions 217 and 227 toward the other-end opening portions 218 and 228. This configuration reduces the degrees of inclination of the outer side faces 214 and 224 and the inner side faces 216 and 226 relative to the passing direction of the shaft portions 189*a* and 189*b* (forward direction FD) immediately before the shaft portions 189*a* and 189*b* press open the openings 212 and 222 to pass through the openings 212 and 222 (immediately before removal). This configuration reduces the possibility that the shaft portions 189*a* and 189*b* are stuck in the cuts Nt1 and Nt2 (for example, corners Eg of the one-end opening portions 217 and 227) and enables the shaft portions 189*a* and 189*b* to smoothly pass through the openings 212 and 222. Suppressing the shaft portions 189*a* and 189*b* from being stuck in the cuts Nt1 and Nt2 reduces a possible variation in external force FP set to cause the shaft portions 189*a* and 189*b* to pass through the cuts Nt1 and Nt2. Additionally, the arrangement that the inclination angles $\theta 1a$, $\theta 1b$, $\theta 2a$ and $\theta 2b$ of the outer side faces 214 and 224 and the inner side faces 216 and 226 relative to the front-rear direction FRD are not less than 7 degrees and not greater than 19 degrees has the following advantageous effects. This configuration further takes into account the deformation (inclination) of the first fixing portion 97 and the second fixing portion 98 immediately before removal and further reduces the degrees of inclination of the outer side faces 214 and 224 and the inner side faces 216 and 226 relative to the passing direction of the shaft portions 189*a* and 189*b* (forward direction FD). This more effectively reduces the possibility that the shaft portions 189*a* and 189*b* are stuck in the cuts Nt1 and Nt2 and enables the shaft portions 189*a* and 189*b* to more smoothly pass through the openings 212 and 222.

According to the embodiment described above, when an external force FP along the longitudinal direction PD1 that is equal to or greater than a predetermined value is applied to the tank 40 by the contact of the fuel cell module 21, the fixation member 70 releases the fixation of the tank 40 to the vehicle body 11. This configuration releases the external force FP applied to the tank 40 by the fuel cell module 21 and thereby reduces the possibility that the tank 40 is damaged. Additionally, the configuration of the above embodiment includes the stable steering brace 19 that is located below the tank 40 and that serves to support the tank 40 released from the fixation to the vehicle body 11. This configuration enables the tank 40 released from the fixation to the vehicle body 11 to be supported by the stable steering brace 19 and reduces the possibility that the tank 40 is damaged by a fall. The stable steering brace 19 serves to support the tank 40. This suppresses the tank 40 from falling out of the vehicle 10. The configuration that the stable steering brace 19 serves as the support member reduces the total number of components. The stable steering brace 19 serving as the support member achieves the steering stability and the protection of the tank 40. The stable steering brace 19 has the lower rigidity than those of the other members (for example, cross member) constituting the vehicle body 11. This relieves the impact by a fall when the stable steering brace 19 holds the tank 40 that falls by the release from the fixation to the vehicle body 11.

B. Modification of Fixation Member

Figure 17:
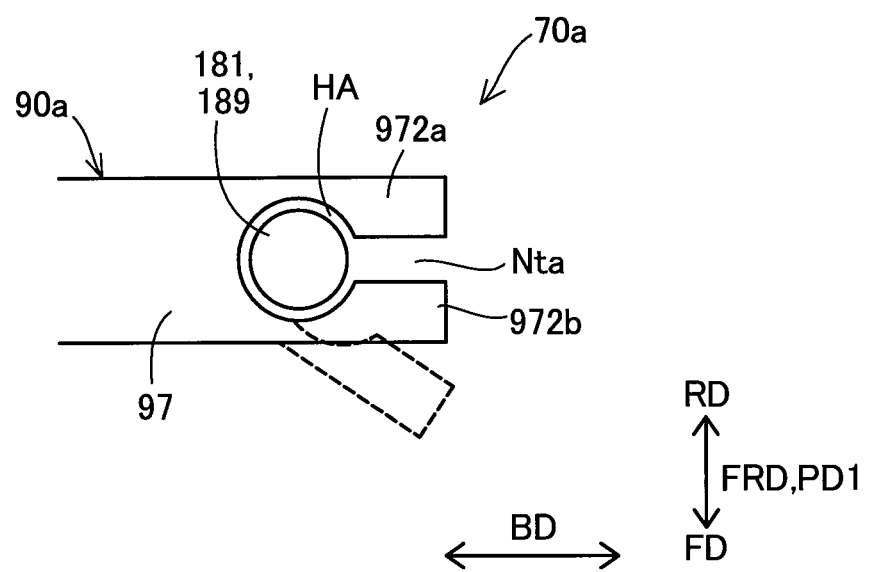
FIG. 17 is a diagram illustrating a fixation member according to a modification.

According to the embodiment described above, the fixation member 70 releases the fixation of the tank 40 to the vehicle body 11 when an external force FP is applied to the tank 40 by a front component and causes the shaft portions 189 of the bolts 181 to pass through the openings 212 and 222 of the cuts Nt. This configuration is, however, not restrictive. FIG. 17 is a diagram illustrating a fixation member 70*a* according to a modification. In this modification, a cut Nta may be extended from the bolt hole HA to an outside end face of the first fixing portion 97 in the width direction BD. Similarly a cut Nta formed in the second fixing portion 98 may be extended from the bolt hole HA to an outside end face of the second fixing portion 98 in the width direction BD. Sections 972a and 972b of the first fixing portion 97 that part the cut Nta are designed to be deformed such that the shaft portion 189 is removed from a second bracket main body 90a when an external force FP along the longitudinal direction PD1 is applied. In the example shown in FIG. 17, when an external force FP along the rearward direction RD is applied, the section 972b is deformed as shown by a broken line such that the shaft portion 189 is removed from the second bracket main body 90a. Removing the shaft portion 189 from the second bracket main body 90a releases the fixation of the tank 40 to the vehicle body 11.

C. Modifications

C-1. First Modification

According to the embodiment described above, the fixation member 70 fixes the tank 40 to the vehicle body 11 at the first mouthpiece portion 47 that is one end portion on the rearward direction RD-side of the tank 40 in the front-rear direction FRD. This configuration is, however, not restrictive. According to a modification, the fixation member 70 may fix the tank 40 to the vehicle body 11 at the second mouthpiece portion 49 that is the other end portion on the forward direction FD-side of the tank 40. According to another modification, the fixation member 70 may fix the tank 40 to the vehicle body 11 at both the first mouthpiece portion 47 and the second mouthpiece portion 49. According to the above embodiment, the body portion 42 of the tank 40 is held by the band 60. The band 60 may, however, be omitted. For example, a member configured to support the body portion 42 from below may be placed in place of the band 60. In another example, the second mouthpiece portion 49 may be fixed to the vehicle body 11 by means of the fixation member 70.

C-2. Second Modification

The tank 40 is fixed to the floor panel 12 of the vehicle body 11 by means of the fixation member 70. This configuration is, however, not restrictive. The tank 40 may be fixed to a different part of the vehicle body 11 other than the floor panel 12.

C-3. Third Modification

The front component is the fuel cell module 21 according to the above embodiment but may be another member. An example of this another member may be the suspension member 31.

C-4. Fourth Modification

The above embodiment uses the stable steering brace 19 as the support member to support the tank 40 that is released from the fixation to the vehicle body 11. This configuration is, however, not restrictive. Another member may be used as the support member or the support member may be omitted.

C-5. Fifth Modification

The inner side faces 216 and 226 are inclined to the front-rear direction FRD according to the above embodiment but may not be inclined. Even in this modification, inclination of the outer side faces 214 and 216 relative to the front-rear direction FRD reduces the possibility that the shaft portions 189 are stuck in the cuts Nt and enables the shaft portions 189 to smoothly pass through the openings 212 and 222.

C-6. Sixth Modification

According to the above embodiment, the first mouthpiece portion 47 includes the convex 41, and the bracket 75 includes the recesses 85 and 95, for the purpose of restricting the motion of the tank 40 in the front-rear direction FRD. This configuration is, however, not restrictive. According to a modification, the first mouthpiece portion 47 may be configured to include a recess, and the bracket 75 may be configured to include convexes that engage with the recess of the first mouthpiece portion 47.

C-7. Seventh Modification

According to the above embodiment, the fixation member 70 or 70a includes the bracket 75 and the bolts 181. This configuration is, however, not restrictive. According to a modification, a pair of plate members may be provided to be extended outward in the width direction BD from both sides in the width direction BD of the first mouthpiece portion 47 and may be fixed to the vehicle body 11 by means of bolts 181. In this modification, the pair of plate members and the bolts 181 serve as the fixation member. One of the pair of plate members includes a bolt hole HA1 and a cut Nt1 like the first fixing portion 97 (shown in FIG. 9), and the other of the pair of plate members includes a bolt hole HA2 and a cut Nt2 like the second fixing portion 98 (shown in FIG. 9).

The present disclosure is not limited to the embodiment described above but includes various modifications. For example, the above embodiment is described in detail for the purpose of description of the present disclosure in an easily understood manner. The present disclosure is not necessarily limited to the configuration including all the components described above. Part of the configuration of the embodiment may be replaced by the configuration of a modification, and the configuration of a modification may be added to the configuration of the embodiment. Part of the configuration of the embodiment may be subjected to addition of another configuration, deletion or replacement. The embodiment may be combined with any of the modifications. The present disclosure may be implemented by aspects described below.

(1) According to one aspect of the present disclosure, there is provided a vehicle with a tank mounted thereon. This vehicle comprises a front component placed in a front room; the tank placed behind the front component in a front-rear direction of the vehicle and arranged such that a longitudinal direction of the tank is along the front-rear direction; and a fixation member configured to fix the tank to a vehicle body of the vehicle on at least one end of the tank in the front-rear direction. The front component and the tank are arranged to at least partly overlap with each other when the vehicle is viewed from a forward direction side. The fixation member releases fixation of the tank to the vehicle body when the front component comes into contact with the tank to apply an external force along the longitudinal direction that is equal to or greater than a predetermined value, to the tank. In the vehicle of this aspect, the fixation member releases the fixation of the tank to the vehicle body when the front component comes into contact with the tank to apply the external force along the longitudinal direction that is equal to or greater than the predetermined value. This configuration releases the external force applied to the tank by the front component and thereby reduces the possibility that the tank is damaged.

(2) In the vehicle of the above aspect, the front component may include a fuel cell stack and an electronic device that is placed on top of the fuel cell stack. This configuration releases the external force applied to the tank by the fuel cell stack and the electronic device and thereby reduces the possibility that the tank is damaged.

(3) In the vehicle of the above aspect, the tank may include a mouthpiece portion that is provided on the end fixed to the vehicle body by the fixation member. The fixation member may comprise a bracket engaged with the mouthpiece portion to restrict motion of the tank in the longitudinal direction and configured to surround the mouthpiece portion in a circumferential direction; and a bolt configured to fix the bracket to the vehicle body at a position on an outer side of a region of the mouthpiece portion that is surrounded by the bracket in a width direction of the vehicle. The bracket may comprise a bracket main body; a bolt hole pierced through the bracket main body in a height direction of the vehicle to cause a shaft portion of the bolt to be inserted through; and a cut configured to form an opening that is extended from the bolt hole in a forward direction and has a smaller width than a diameter of the shaft portion. The cut may comprise a one-end opening portion configured to form one end of the opening and connected with the bolt hole; an other-end opening portion configured to form the other end of the opening and opposed to the one-end portion in the front-rear direction; an outer side face configured to form a side face of the opening on an outer side in the width direction of the vehicle; and an inner side face configured to form a side face of the opening on an inner side in the width direction of the vehicle. The outer side face may be inclined to the front-rear direction, such as to be located on an outer side in the width direction from the one-end opening portion toward the other-end opening portion. When the external force is applied to the tank, the cut may cause the shaft portion to pass through the opening and release the fixation of the tank to the vehicle body. When the external force is applied to the tank and causes the shaft portion to start passing through the opening of the cut, part of the bracket main body where the cut is formed is inclined to the forward direction that is a passing direction of the shaft portion (removal direction). The outer side face of the cut is inclined to the front-rear direction, such as to be located on the outer side in the width direction from the one-end opening portion toward the other-end opening portion. This configuration reduces the degree of inclination of the outer side face relative to the passing direction of the shaft portion. This accordingly reduces the possibility that the shaft portion is stuck in the cut and enables the shaft portion to smoothly pass through the opening.

(4) In the vehicle of the above aspect, the outer side face may be inclined to the front-rear direction in an angle range of not less than 7 degrees and not greater than 19 degrees. This configuration further reduces the degree of inclination of the outer side face relative to the passing direction of the shaft portion. This configuration more effectively reduces the possibility that the shaft portion is stuck in the cut and enables the shaft portion to more smoothly pass through the opening.

(5) In the vehicle of the above aspect, the inner side face may be inclined to the front-rear direction, such as to be located on an outer side in the width direction from the one-end opening portion toward the other-end opening portion. The inner side face of the cut is inclined to the front-rear direction, such as to be located on the outer side in the width direction from the one-end opening portion toward the other-end opening portion. This configuration reduces the degree of inclination of the inner side face relative to the passing direction of the shaft portion. This accordingly reduces the possibility that the shaft portion is stuck in the cut and enables the shaft portion to smoothly pass through the opening.

(6) In the vehicle of the above aspect, the inner side face may be inclined to the front-rear direction in an angle range of not less than 7 degrees and not greater than 19 degrees. This configuration further reduces the degree of inclination of the inner side face relative to the passing direction of the shaft portion. This configuration more effectively reduces the possibility that the shaft portion is stuck in the cut and enables the shaft portion to more smoothly pass through the opening.

(7) The vehicle of the above aspect may further comprise a support member located below the tank to support the tank that is released from fixation to the vehicle body. This configuration enables the tank that is released from the fixation to the vehicle body to be supported by the support member and thereby reduces the possibility that the tank is damaged by a fall.

(8) In the vehicle of the above aspect, the support member may be a stable steering brace. This configuration causes the stable steering brace to serve as the support member and thereby reduces the total number of components.

The present disclosure may be implemented by various aspects other than the aspects of the vehicle described above, for example, a bracket that is configured to fix a tank to a vehicle body and a fixation structure configured to fix a tank to a vehicle body.

What is claimed is:

1. A vehicle with a tank mounted thereon, comprising:
a front component placed in a front room;
the tank placed behind the front component in a front-rear direction of the vehicle and arranged such that a longitudinal direction of the tank is along the front-rear direction; and
a fixation member configured to fix the tank to a vehicle body of the vehicle on an end of the tank in the front-rear direction, wherein
the front component and the tank are arranged to at least partly overlap with each other when the vehicle is viewed from a forward direction side,
the fixation member releases fixation of the tank to the vehicle body when the front component comes into contact with the tank to apply an external force along the longitudinal direction that is equal to or greater than a predetermined value, to the tank,
the tank includes a mouthpiece portion that is provided on the end fixed to the vehicle body by the fixation member, and
the fixation member comprises:
a bracket engaged with the mouthpiece portion to restrict motion of the tank in the longitudinal direction and configured to surround the mouthpiece portion in a circumferential direction; and
a bolt configured to fix the bracket to the vehicle body at a position on an outer side of a region of the mouthpiece portion that is surrounded by the bracket in a width direction of the vehicle,
the bracket comprises:
a bracket main body;
a bolt hole pierced through the bracket main body in a height direction of the vehicle to cause a shaft portion of the bolt to be inserted through; and
a cut configured to form an opening that is extended from the bolt hole in a forward direction and has a smaller width than a diameter of the shaft portion,
the cut comprises:
a one-end opening portion configured to form one end of the opening and connected with the bolt hole;
an other-end opening portion configured to form an other end of the opening and opposed to the one-end portion in the front-rear direction;
an outer side face configured to form a side face of the opening on an outer side in the width direction of the vehicle; and an inner side face configured to form a side face of the opening on an inner side in the width direction of the vehicle, the outer side face is inclined to the front-rear direction, such as to be located on an outer side in the width direction from the one-end opening portion toward the other-end opening portion, and when the external force is applied to the tank, the cut causes the shaft portion to pass through the opening and releases the fixation of the tank to the vehicle body.

2. The vehicle according to claim 1,
wherein the front component includes a fuel cell stack and an electronic device that is placed on top of the fuel cell stack.

3. The vehicle according to claim 1,
wherein the outer side face is inclined to the front-rear direction in an angle range of not less than 7 degrees and not greater than 19 degrees.

4. The vehicle according to claim 1,
wherein the inner side face is inclined to the front-rear direction, such as to be located on an outer side in the width direction from the one-end opening portion toward the other-end opening portion.

5. The vehicle according to claim 4,
wherein the inner side face is inclined to the front-rear direction in an angle range of not less than 7 degrees and not greater than 19 degrees.

6. The vehicle according to claim 1, further comprising:
a support member located below the tank to support the tank that is released from the fixation to the vehicle body.

7. The vehicle according to claim 6,
wherein the support member is a stable steering brace.

* * * * *